US009467650B2

(12) United States Patent
Jing et al.

(10) Patent No.: US 9,467,650 B2
(45) Date of Patent: Oct. 11, 2016

(54) METHOD AND APPARATUS FOR TRANSMITTING MEDIA STREAM IN VIDEO CONFERENCE

(71) Applicant: Huawei Device Co., Ltd., Shenzhen (CN)

(72) Inventors: Hao Jing, Shenzhen (CN); Wenmei Gao, Beijing (CN); Shunan Fan, Beijing (CN); Xiaoqiang Lv, Shenzhen (CN); Yahui Wang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/915,469

(22) PCT Filed: Aug. 20, 2014

(86) PCT No.: PCT/CN2014/084777
§ 371 (c)(1),
(2) Date: Feb. 29, 2016

(87) PCT Pub. No.: WO2015/032277
PCT Pub. Date: Mar. 12, 2015

(65) Prior Publication Data
US 2016/0227161 A1 Aug. 4, 2016

(30) Foreign Application Priority Data
Sep. 5, 2013 (CN) .......................... 2013 1 0400528

(51) Int. Cl.
*H04N 7/14* (2006.01)
*G06Q 10/06* (2012.01)
(Continued)

(52) U.S. Cl.
CPC .......... *H04N 7/147* (2013.01); *G06F 3/04842* (2013.01); *H04N 7/15* (2013.01)

(58) Field of Classification Search
CPC combination set(s) only.
See application file for complete search history.

(56) References Cited

U.S. PATENT DOCUMENTS 6,421,706 B1 * 7/2002 McNeill ................. G06Q 10/10
709/204
2007/0250569 A1 10/2007 Mutikainen et al.
(Continued)

FOREIGN PATENT DOCUMENTS

CN 101677397 A 3/2010
CN 102281460 A 12/2011
(Continued)

OTHER PUBLICATIONS

Foreign Communication From a Counterpart Application, PCT Application No. PCT/CN2014/084777, English Translation of International Search Report dated Dec. 2, 2014, 2 pages.
(Continued)

*Primary Examiner* — Joseph J Nguyen
(74) *Attorney, Agent, or Firm* — Conley Rose, P.C.; Grant Rodolph; Nicholas K. Beaulieu

(57) ABSTRACT

A method for transmitting a media stream in a video conference. The method includes, receiving a first media stream sent by a conference server, where the first media stream includes video and audio information of all conference participants in the video conference, receiving a select instruction, where the select instruction is selecting, from the video and audio information of all the conference participants, a conference participant corresponding to required video and audio information, sending a transmission request message to the conference server according to the select instruction by using a web real-time communication (WebRTC) application, where the transmission request message includes identification information of the selected conference participant, and receiving a second media stream that is sent by the conference server according to the identification information, where the second media stream includes the video and audio information of the selected conference participant.

9 Claims, 13 Drawing Sheets

(51) Int. Cl.
*H04N 7/15* (2006.01)
*G06F 3/0484* (2013.01)

(56) References Cited

U.S. PATENT DOCUMENTS

| | | | |
|---|---|---|---|
| 2012/0212439 A1 | 8/2012 | Haldar et al. | |
| 2014/0126715 A1* | 5/2014 | Lum | H04M 3/5133 379/265.09 |
| 2014/0293046 A1* | 10/2014 | Ni | H04N 7/181 348/143 |
| 2015/0002619 A1* | 1/2015 | Johnston | H04N 7/147 348/14.12 |
| 2015/0039687 A1* | 2/2015 | Waxman | H04L 67/02 709/204 |
| 2015/0039760 A1* | 2/2015 | Yoakum | H04L 65/1059 709/225 |
| 2015/0365244 A1* | 12/2015 | Schmitz | H04L 65/605 715/753 |

FOREIGN PATENT DOCUMENTS

| | | |
|---|---|---|
| CN | 102469294 A | 5/2012 |
| CN | 203070033 U | 7/2013 |

OTHER PUBLICATIONS

Foreign Communication From a Counterpart Application, PCT Application No. PCT/CN2014/084777, English Translation of Written Opinion dated Dec. 2, 2014, 9 pages.

Jennings, C., "Proposed Plan for Usage of SDP and RTP," draft-jennings-rtcweb-plan-01, Feb. 25, 2013, 42 pages.

Perkins, C. S., et al., "Web Real-Time Communication (WebRTC): Media Transport and Use of RTP," draft-ietf-rtcweb-rtp-usage-07, Jul. 15, 2013, 62 pages.

Foreign Communication From A Counterpart Application, European Application No. 14842852.7, Extended European Search Report dated Jul. 1, 2016, 14 pages.

* cited by examiner

METHOD AND APPARATUS FOR TRANSMITTING MEDIA STREAM IN VIDEO CONFERENCE

CROSS-REFERENCE TO RELATED APPLICATIONS

This application is a National Stage of International Application No. PCT/CN2014/084777, filed on Aug. 20, 2014, which claims priority to Chinese Patent Application No. 201310400528.3, filed on Sep. 5, 2013, both of which are hereby incorporated by reference in their entireties.

TECHNICAL FIELD

The present disclosure relates to the field of communications technologies, and in particular, to a method and an apparatus for transmitting a media stream in a video conference.

BACKGROUND

A web real-time communication (WebRTC) technology can implement functions such as audio and video communication and a multi-party conference between different browsers or between a browser and a terminal, as shown in FIG. 1.

On the left of FIG. 1, user 1 accesses a website of a WebRTC application, opens a web page of the WebRTC application, and establishes a communication connection with the website of the WebRTC application using JavaScript code in the web page. On the right of FIG. 1, user 2 also accesses the website of the WebRTC application, opens the web page of the WebRTC application, and establishes a communication connection with the website of the WebRTC application using the JavaScript code in the web page. In this case, user 1 and user 2 establish a connection with each other by using user information provided by the website of the WebRTC application, and invoke a function of their respective browsers by using a JavaScript application programming interface (API) to perform media stream transmission.

Currently, in the prior art, when user 1 uses terminal 1 (for example, a mobile phone) to participate in a WebRTC video conference, a conference server sends mixed videos/audio to terminal 1 after performing frequency mixing/audio mixing on videos/audio of all conference participants that participate in the video conference, or user 1 uploads video and audio information in terminal 1 to the conference server using terminal 1. However, the prior art has the following disadvantages: (1) The conference server can only distribute the mixed videos/audio to each user after performing the frequency mixing/audio mixing on the videos/audio of all the conference participants that participate in the video conference, and cannot collect or combine videos and audio of a specific conference participant, which reduces user experience, and also increases used bandwidth of the terminal and local resource consumption of the terminal.

SUMMARY

Embodiments of the present disclosure provide a method and an apparatus for transmitting a media stream in a video conference, which can implement that a conference server sends video and audio information of a specific conference participant to a terminal according to user's selection.

In a first aspect, an embodiment of the present disclosure provides a method for transmitting a media stream in a video conference, where the method includes receiving a first media stream sent by a conference server, where the first media stream includes video and audio information of all conference participants in the video conference, receiving a select instruction, where the select instruction is selecting, from the video and audio information of all the conference participants, a conference participant corresponding to required video and audio information; sending a transmission request message to the conference server according to the select instruction using a WebRTC application, where the transmission request message includes identification information of the selected conference participant, and receiving a second media stream that is sent by the conference server according to the identification information, where the second media stream includes the video and audio information of the selected conference participant.

In a first possible implementation manner, before the sending a transmission request message to the conference server according to the select instruction using a WebRTC application, the method further includes receiving, according to the select instruction, a create instruction sent by the WebRTC application, according to the create instruction, invoking an extended WebRTC interface, and parsing a conference participant attribute of a constraint object in the extended WebRTC interface, extracting the identification information of the selected conference participant from the conference participant attribute, and storing each piece of the identification information of the conference participant in a conference participant list, invoking a content attribute in an extended session description protocol (SDP), loading the conference participant list into a media source identifier mediacnt-src section of the content attribute in the extended SDP, adding the mediacnt-src section to the transmission request message, so that the transmission request message includes the identification information of the selected conference participant, and sending the transmission request message to the conference server using the WebRTC application.

With reference to the first aspect or the first possible implementation manner of the first aspect, in a second possible implementation manner, before the parsing a conference participant attribute of a constraint object in the extended WebRTC interface, the method further includes storing the identification information of the selected conference participant in the conference participant attribute.

With reference to the first aspect, or the first or the second possible implementation manner of the first aspect, in a third possible implementation manner, before the receiving a second media stream that is sent by the conference server according to the identification information, the method further includes receiving, using the WebRTC application, a transmission response message that is sent by the conference server according to the transmission request message, so as to determine that a transmission connection is already established with the conference server.

With reference to the first aspect, or the first, the second, or the third possible implementation manner of the first aspect, in a fourth possible implementation manner, after the receiving a second media stream that is sent by the conference server according to the identification information, the method further includes transmitting the second media stream to the WebRTC application, so that the WebRTC application plays the second media stream.

In a second aspect, an embodiment of the present disclosure provides a method for transmitting a media stream in a video conference, where the method includes sending a first media stream to a browser, where the first media stream includes video and audio information of all conference participants in the video conference, receiving a transmission request message that is sent by the browser using a WebRTC application, where the transmission request message includes identification information of a conference participant that is corresponding to required video and audio information and selected from the video and audio information of all the conference participants, extracting, according to the identification information, the video and audio information of the conference participant corresponding to the identification information, and sending a second media stream to the browser, where the second media stream includes the video and audio information of the selected conference participant.

In a first possible implementation manner, after the receiving a transmission request message that is sent by the browser by using a WebRTC application, the method further includes, invoking an extended WebRTC interface, extracting the identification information of the selected conference participant from the transmission request message according to the invoked extended WebRTC interface, storing the identification information of the selected conference participant in a conference participant list, and sending a transmission response message to the browser by using a connection that is established between the extended WebRTC interface and the WebRTC application, so that the browser can determine that a transmission connection is already established with a conference server.

With reference to the second aspect or the first possible implementation manner of the second aspect, in a second possible implementation manner, the extracting, according to the identification information, the video and audio information of the conference participant corresponding to the identification information further includes, extracting a media tracking object of the corresponding conference participant from the extended WebRTC interface according to the identification information that is of the selected conference participant and stored in the conference participant list, where the media tracking object includes the video and audio information of the conference participant.

With reference to the second aspect or the second possible implementation manner of the second aspect, in a third possible implementation manner, the sending a second media stream to the browser, where the second media stream includes the video and audio information of the selected conference participant further includes adding the media tracking object to the second media stream, so that the second media stream includes the video and audio information of the selected conference participant.

In a third aspect, an embodiment of the present disclosure provides a method for transmitting a media stream in a video conference, where the method includes when a first browser of a first terminal and a second browser of a second terminal access a conference server by using login information of a same user, and the first browser does not send a first media stream to the conference server, receiving, by the second browser, a first select instruction, where the first select instruction is selecting to-be-sent video and audio information from the second terminal, sending a first transmission request message to the conference server according to the first select instruction using a first WebRTC application of the second terminal, where the first transmission request message includes port attribute information of the second browser, and when a first transmission response message that is sent by the conference server according to the first transmission request message is received, sending a second media stream to the conference server according to the port attribute information using a corresponding port, where the second media stream includes the to-be-sent video and audio information.

In a first possible implementation manner, before the second browser receives the first select instruction entered by the user, the method further includes receiving a third media stream sent by the conference server, where the third media stream includes video and audio information of all conference participants in the video conference; receiving a second select instruction, where the second select instruction is selecting, from the video and audio information of all the conference participants, a conference participant corresponding to required video and audio information; sending a second transmission request message to the conference server according to the second select instruction using the first WebRTC application, where the second transmission request message includes identification information of the selected conference participant, receiving, by using the first WebRTC application, a second transmission response message sent by the conference server, where the second transmission response message is used for the second browser to determine not to send video and audio information in the second terminal to the conference server when the first browser sends the first media stream to the conference server exists; and receiving a fourth media stream that is sent by the conference server according to the identification information, where the fourth media stream includes the video and audio information of the selected conference participant.

With reference to the third aspect or the first possible implementation manner of the third aspect, in a second possible implementation manner, before the sending a first transmission request message to the conference server according to the first select instruction using a first WebRTC application of the second terminal, the method further includes: receiving, according to the first select instruction, a create instruction sent by the first WebRTC application, according to the create instruction, invoking an extended WebRTC interface, and determining a video sending attribute value and an audio sending attribute value that are of a constraint object in the extended WebRTC interface, when the video sending attribute value is true, setting an attribute of a first video port that has received video information to a port only for receiving a video, and setting an attribute of a second video port that has not received video information to a port only for sending a video, when the audio sending attribute value is true, setting an attribute of an audio port to a transmit and receive port, adding information about the set port attribute to the first transmission request message, so that the first transmission request message includes the port attribute information of the second browser, and sending the first transmission request message to the conference server using the first WebRTC application of the second terminal.

In a fourth aspect, an embodiment of the present disclosure provides a method for transmitting a media stream in a video conference, where the method includes: when a first browser of a first terminal and a second browser of a second terminal access a conference server by using login information of a same user, and the first browser does not send a first media stream to the conference server, receiving, by the conference server, a first transmission request message that is sent by the second browser by using a first WebRTC application of the second terminal, where the first transmission request message includes port attribute information of the second browser, sending a first transmission response message to the second browser according to the first transmission request message, so that the second browser can determine that a transmission connection is already established with the conference server, and receiving a second media stream that is sent by the second browser according to the port attribute information, where the second media stream includes to-be-sent video and audio information selected from the second terminal.

In a first possible implementation manner, before the receiving, by the conference server, a first transmission request message that is sent by the second browser using a first WebRTC application of the second terminal, the method further includes sending a third media stream to the second browser, where the third media stream includes video and audio information of all conference participants in the video conference; receiving a second transmission request message that is sent by the second browser by using the first WebRTC application, where the second transmission request message includes identification information of a conference participant that is corresponding to required video and audio information and selected from the video and audio information of all the conference participants, according to the second transmission request message, invoking an extended WebRTC interface and determining whether the first browser is sending the media stream, if the first browser is sending the media stream, setting a port attribute of the conference server to a send-only port, adding information about the set port attribute to a second transmission response message, and sending the second transmission response message to the second browser by using the first WebRTC application, where the second transmission response message is used for the second browser to determine not to send video and audio information in the second terminal to the conference server when the first browser sends the media stream to the conference server exists, extracting, according to the identification information, the video and audio information of the conference participant corresponding to the identification information; and sending a fourth media stream to the second browser, where the fourth media stream includes the video and audio information of the selected conference participant.

With reference to the fourth aspect or the first possible implementation manner of the fourth aspect, in a second possible implementation manner, after the receiving a second media stream that is sent by the second browser according to the port attribute information, the method further includes sending a fifth media stream to a corresponding port of the second browser according to the port attribute information.

With reference to the fourth aspect, or the first or the second possible implementation manner of the fourth aspect, in a third possible implementation manner, after the receiving a second media stream that is sent by the second browser according to the port attribute information, the method further includes: invoking the extended WebRTC interface, and determining a video receiving attribute value and an audio receiving attribute value that are of a constraint object in the extended WebRTC interface, when the video receiving attribute value is true, setting an attribute of a video port that has received video information to a port only for sending a video, when the audio receiving attribute value is true, setting an attribute of an audio port that has received audio information to a port only for sending audio, and adding information about the set port attribute to a third transmission request message, and sending the third transmission request message to the first browser, where the third transmission request message is used for the first browser to determine not to send video and audio information in the first terminal to the conference server.

In a fifth aspect, an embodiment of the present disclosure provides an apparatus for transmitting a media stream in a video conference, where the transmission apparatus is located in a terminal and the apparatus includes: a receiving unit configured to receive a first media stream sent by a conference server, where the first media stream includes video and audio information of all conference participants in the video conference, where the receiving unit is further configured to receive a select instruction, where the select instruction is selecting, from the video and audio information of all the conference participants, a conference participant corresponding to required video and audio information; and a sending unit configured to send a transmission request message to the conference server according to the select instruction using a WebRTC application, where the transmission request message includes identification information of the selected conference participant, where the receiving unit is further configured to receive a second media stream that is sent by the conference server according to the identification information, where the second media stream includes the video and audio information of the selected conference participant.

In a first possible implementation manner, the receiving unit is further configured to receive, according to the select instruction, a create instruction sent by the WebRTC application; the transmission apparatus further includes: an invoking unit configured to: according to the create instruction, invoke an extended WebRTC interface, and parse a conference participant attribute of a constraint object in the extended WebRTC interface, and an extracting unit configured to extract the identification information of the selected conference participant from the conference participant attribute, and store each piece of the identification information of the conference participant in a conference participant list, where the invoking unit is further configured to invoke a content attribute in an extended SDP, and the transmission apparatus further includes: a loading unit configured to load the conference participant list into a media source identifier mediacnt-src section of the content attribute in the extended SDP, and an adding unit configured to add the mediacnt-src section to the transmission request message, so that the transmission request message includes the identification information of the selected conference participant; where the sending unit is further configured to send the transmission request message to the conference server using the WebRTC application.

With reference to the fifth aspect or the first possible implementation manner of the fifth aspect, in a second possible implementation manner, the apparatus further includes: a storage unit configured to store the identification information of the selected conference participant in the conference participant attribute.

With reference to the fifth aspect, or the first or the second possible implementation manner of the fifth aspect, in a third possible implementation manner, the receiving unit is further configured to: receive, using the WebRTC application, a transmission response message that is sent by the conference server according to the transmission request message, so as to determine that a transmission connection is already established with the conference server.

With reference to the fifth aspect, or the first, the second, or the third possible implementation manner of the fifth aspect, in a fourth possible implementation manner, the transmission apparatus further includes: a transmission unit configured to transmit the second media stream to the WebRTC application, so that the WebRTC application plays the second media stream.

In a sixth aspect, an embodiment of the present disclosure provides an apparatus for transmitting a media stream in a video conference, where the apparatus includes: a sending unit configured to send a first media stream to a browser, where the first media stream includes video and audio information of all conference participants in the video conference, a receiving unit configured to receive a transmission request message that is sent by the browser by using a WebRTC application, where the transmission request message includes identification information of a conference participant that is corresponding to required video and audio information and selected from the video and audio information of all the conference participants, and an extracting unit configured to extract, according to the identification information, the video and audio information of the conference participant corresponding to the identification information, where the sending unit is further configured to send a second media stream to the browser, where the second media stream includes the video and audio information of the selected conference participant.

In a first possible implementation manner, the transmission apparatus further includes: an invoking unit configured to invoke an extended WebRTC interface, where the extracting unit is further configured to extract the identification information of the selected conference participant from the transmission request message according to the invoked extended WebRTC interface; and the apparatus further includes: a storage unit configured to store the identification information of the selected conference participant in a conference participant list, where the sending unit is further configured to send a transmission response message to the browser using a connection that is established between the extended WebRTC interface and the WebRTC application, so that the browser can determine that a transmission connection is already established with the conference server.

In a second possible implementation manner, the extracting unit is further configured to: extract a media tracking object of the corresponding conference participant from the extended WebRTC interface according to the identification information that is of the selected conference participant and stored in the conference participant list by the storage unit, where the media tracking object includes the video and audio information of the conference participant.

With reference to the sixth aspect or the second possible implementation manner of the sixth aspect, in a third possible implementation manner, the sending unit is further configured to: add the media tracking object to the second media stream, so that the second media stream includes the video and audio information of the selected conference participant.

In a seventh aspect, an embodiment of the present disclosure provides an apparatus for transmitting a media stream in video conference, where each conference site in the video conference includes a first terminal and a second terminal, the transmission apparatus is located in the second terminal, and the apparatus includes: a receiving unit configured to receive a first select instruction when a browser of a first terminal and the transmission apparatus access a conference server using login information of a same user and the browser does not send a first media stream to the conference server, where the first select instruction is selecting to-be-sent video and audio information from the second terminal; and a sending unit configured to send a first transmission request message to the conference server according to the first select instruction using a first WebRTC application of the second terminal, where the first transmission request message includes port attribute information of the transmission apparatus, where the sending unit is further configured to: when a first transmission response message that is sent by the conference server according to the first transmission request message is received, send a second media stream to the conference server according to the port attribute information using a corresponding port, where the second media stream includes the to-be-sent video and audio information.

In a first possible implementation manner, the receiving unit is further configured to receive a third media stream sent by the conference server, where the third media stream includes video and audio information of all conference participants in the video conference, the receiving unit is further configured to receive a second select instruction, where the second select instruction is selecting, from the video and audio information of all the conference participants, a conference participant corresponding to required video and audio information. The sending unit is further configured to send a second transmission request message to the conference server according to the second select instruction using the first WebRTC application, where the second transmission request message includes identification information of the selected conference participant. The receiving unit is further configured to receive, using the first WebRTC application, a second transmission response message sent by the conference server, where the second transmission response message is used for the transmission apparatus to determine not to send video and audio information in the second terminal to the conference server when the browser sends the first media stream to the conference server exists, and the receiving unit is further configured to receive a fourth media stream that is sent by the conference server according to the identification information, where the fourth media stream includes the video and audio information of the selected conference participant.

With reference to the seventh aspect or the first possible implementation manner of the seventh aspect, in a second possible implementation manner, the receiving unit is further configured to receive, according to the first select instruction, a create instruction sent by the first WebRTC application, and the transmission apparatus further includes, an invoking unit configured to: according to the create instruction, invoke an extended WebRTC interface, and determine a video sending attribute value and an audio sending attribute value that are of a constraint object in the extended WebRTC interface, and a setting unit configured to: when the video sending attribute value is true, set an attribute of a first video port that has received video information to a port only for receiving a video, and set an attribute of a second video port that has not received video information to a port only for sending a video, where the setting unit is further configured to: when the audio sending attribute value is true, set an attribute of an audio port to a transmit and receive port; and the transmission apparatus further includes: an adding unit configured to add information about the set port attribute to the first transmission request message, so that the first transmission request message includes the port attribute information of the transmission apparatus, where the sending unit is further configured to send the first transmission request message to the conference server using the first WebRTC application of the second terminal.

In an eighth aspect, an embodiment of the present disclosure provides an apparatus for transmitting a media stream in a video conference, where the apparatus includes: a receiving unit configured to when a first browser of a first terminal and a second browser of a second terminal access the transmission apparatus by using login information of a same user, and the first browser does not send a first media stream to the transmission apparatus, receive a first transmission request message that is sent by the second browser using a first WebRTC application of the second terminal, where the first transmission request message includes port attribute information of the second browser, and a sending unit configured to send a first transmission response message to the second browser according to the first transmission request message, so that the second browser can determine that a transmission connection is already established with the transmission apparatus, where the receiving unit is further configured to receive a second media stream that is sent by the second browser according to the port attribute information, where the second media stream includes to-be-sent video and audio information selected from the second terminal.

In a first possible implementation manner, the sending unit is further configured to send a third media stream to the second browser, where the third media stream includes video and audio information of all conference participants in the video conference. The receiving unit is further configured to receive a second transmission request message that is sent by the second browser using the first WebRTC application, where the second transmission request message includes identification information of a conference participant that is corresponding to required video and audio information and selected from the video and audio information of all the conference participants. The transmission apparatus further includes: a determining unit configured to, according to the second transmission request message, invoke an extended WebRTC interface and determine whether the first browser is sending the media stream, and a setting unit configured to, if the first browser is sending the media stream, set a port attribute of the transmission apparatus to a send-only port. The sending unit is further configured to add information about the set port attribute to a second transmission response message, and send the second transmission response message to the second browser using the first WebRTC application, where the second transmission response message is used for the second browser to determine not to send video and audio information in the second terminal to the transmission apparatus when the first browser sends the media stream to the transmission apparatus exists, and the transmission apparatus further includes: an extracting unit configured to extract, according to the identification information, the video and audio information of the conference participant corresponding to the identification information, where the sending unit is further configured to send a fourth media stream to the second browser, where the fourth media stream includes the video and audio information of the selected conference participant.

With reference to the eighth aspect or the first possible implementation manner of the eighth aspect, in a second possible implementation manner, the sending unit is further configured to send a fifth media stream to a corresponding port of the second browser according to the port attribute information.

With reference to the eighth aspect, or the first or the second possible implementation manner of the eighth aspect, in a third possible implementation manner, the determining unit is further configured to invoke the extended WebRTC interface, and determine a video receiving attribute value and an audio receiving attribute value that are of a constraint object in the extended WebRTC interface. The setting unit is further configured to: when a result of the determining by the determining unit is that the video receiving attribute value is true, set an attribute of a video port that has received video information to a port only for sending a video. The setting unit is further configured to: when the result of the determining by the determining unit is that the audio receiving attribute value is true, set an attribute of an audio port that has received audio information to a port only for sending audio, and the sending unit is further configured to add information about the set port attribute to a third transmission request message, and send the third transmission request message to the first browser, where the third transmission request message is used for the first browser to determine not to send video and audio information in the first terminal to the transmission apparatus.

In conclusion, by applying the method and the apparatus for transmitting a media stream in a video conference according to the embodiments of the present disclosure, a browser of a terminal sends a transmission request message to a conference server according to an instruction of performing selection among video and audio information of all conference participants in the video conference, further receives video and audio information of a selected conference participant, and plays the received video and audio information using a WebRTC application, thereby resolving a problem in the prior art. The browser receives a video and audio of a specific conference participant, so that a video and audio of a conference participant that a user is not interested in can be shielded, thereby enhancing a function of a WebRTC video conference, improving user experience, saving network bandwidth, and reducing local resource consumption of the terminal.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

To facilitate understanding of the embodiments of the present disclosure, the following uses specific embodiments to provide further explanation with reference to the accompanying drawings, and the embodiments constitute no limitation on the embodiments of the present disclosure.

Embodiment 1

Figure 1:
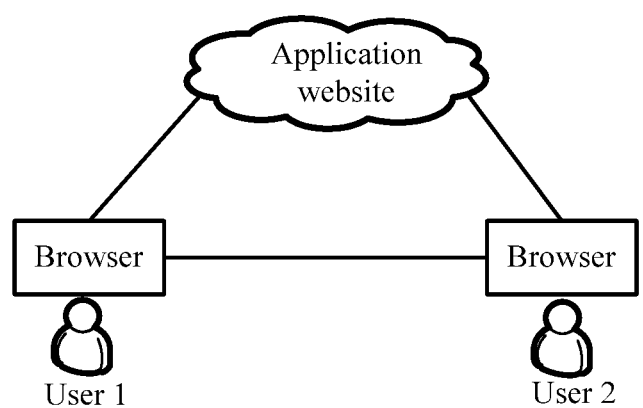
FIG. 1 is a schematic system diagram of a WebRTC technology in the prior art.
Figure 2:
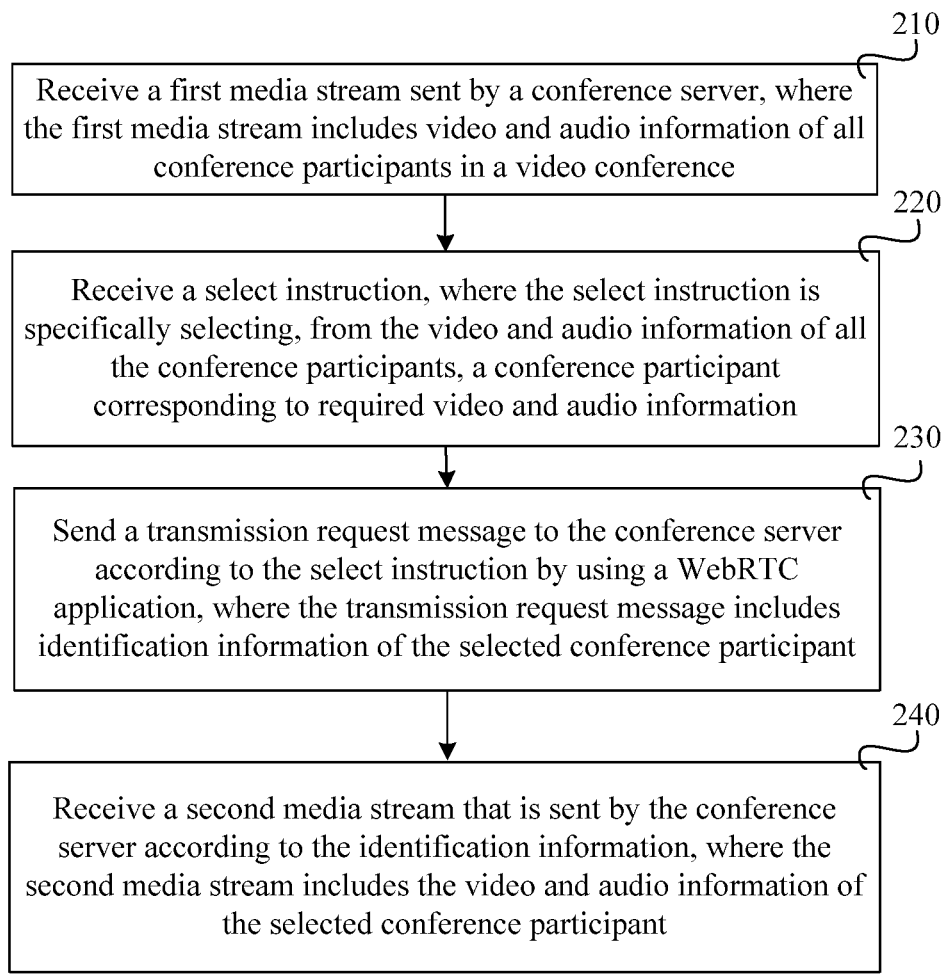
FIG. 2 is a flowchart of a method for transmitting a media stream in a video conference according to Embodiment 1 of the present disclosure.

The following uses FIG. 2 as an example to describe in detail a method for transmitting a media stream in a video conference according to Embodiment 1 of the present disclosure. FIG. 2 is a flowchart of the method for transmitting a media stream in a video conference according to Embodiment 1 of the present disclosure. In this embodiment of the present disclosure, an implementation body is a browser, and the browser is located in a terminal. In this embodiment of the present disclosure, the terminal further refers to a mobile terminal such as a smartphone or a tablet computer, or a fixed terminal such as a personal computer or a smart television. As shown in FIG. 2, this embodiment further includes the following steps:

Step 210: Receive a first media stream sent by a conference server, where the first media stream includes video and audio information of all conference participants in the video conference.

Furthermore, in this embodiment of the present disclosure, when the browser of the terminal accesses the conference server, that is, when the browser establishes a connection with the conference server, the browser receives the first media stream sent by the conference server, where the first media stream includes the video and audio information of all the conference participants in the video conference.

Further, that the browser accesses the conference server is a prior art, which is only briefly described herein. The browser logs in to a network server to acquire a web page of a WebRTC video conference application. The browser receives login information (a user name and a password) entered by a user and sends authentication information to the network server, where the authentication information includes the user name and the password. The network server sends the authentication information to a database. The database sends conference information to the network server after performing data verification, where the conference information includes an internet protocol (IP) address, a port number, and the like that are of the video conference. The network server sends the acquired conference information to the WebRTC application of the terminal. The WebRTC application sends a create instruction and an add instruction to the browser according to the received conference information, and the browser creates a connection object and adds video and audio information stored in the terminal to the connection object; the browser creates a connection request message using the created connection object and adds the connection object to the connection request message, and in addition, the browser receives a save instruction sent by the WebRTC application and also adds media attribute information of the terminal to the connection request message, the browser sends the connection request message to the WebRTC application, the WebRTC application sends the connection request message to the conference server, and the conference server creates a connection object according to the connection request message, saves the media attribute information of the terminal, creates a connection response message according to the connection request message, and adds media attribute information of the conference server to the connection response message. The conference server sends the connection response message to the browser using the WebRTC application. Then, the browser accesses the conference server, that is, the browser establishes the connection with the conference server.

Step 220: Receive a select instruction, where the select instruction is selecting, from the video and audio information of all the conference participants, a conference participant corresponding to required video and audio information.

Furthermore, after the browser receives the first media stream sent by the conference server, the browser parses the first media stream to extract the video and audio information of each conference participant, and displays the video and audio information of each conference participant on a user interface, and the browser receives the select instruction, where the select instruction is entered by the user and the select instruction is selecting, by the user, the conference participant corresponding to the required video and audio information from the video and audio information that is of all the conference participants and displayed on the user interface, that is, selecting, by the user, the required conference participant according to the video and audio information that is of all the conference participants and displayed on the user interface.

In this embodiment of the present disclosure, the selected conference participant indicates that only video and audio information corresponding to the selected conference participant is subsequently received.

Step 230: Send a transmission request message to the conference server according to the select instruction using a WebRTC application, where the transmission request message includes identification information of the selected conference participant.

The browser sends the transmission request message to the conference server according to the select instruction using the WebRTC application, where the transmission request message includes the identification information of the selected conference participant. The identification information is used to determine the conference participant required by the user. The WebRTC application is a WebRTC application inside the terminal.

Further, when receiving the select instruction, the browser further extracts the identification information of the selected conference participant according to the select instruction, and adds the identification information to the transmission request message.

Step 240: Receive a second media stream that is sent by the conference server according to the identification information, where the second media stream includes the video and audio information of the selected conference participant.

After sending the transmission request message to the conference server, the browser receives the second media stream that is sent by the conference server according to the identification information included in the transmission request message, where the second media stream includes the video and audio information of the selected conference participant, so that the conference server sends video and audio information of a specific conference participant to the terminal according to selection of the user, thereby improving user experience, saving network bandwidth, and reducing local resource consumption of the terminal.

Optionally, before step 230 in this embodiment of the present disclosure, a step in which the browser generates the transmission request message according to the select instruction is further included. A specific step is as follows:

Generate the transmission request message according to the select instruction.

The browser receives, according to the select instruction, a create instruction sent by the WebRTC application, according to the create instruction, the browser invokes an extended WebRTC interface and parses a conference participant attribute of a constraint object in the extended WebRTC interface. The browser extracts the identification information of the selected conference participant from the conference participant attribute, and stores each piece of the identification information of the conference participant in a conference participant list. The browser invokes a content attribute in an extended SDP. The browser loads the conference participant list into a media source identifier mediacnt-src section of the content attribute in the extended SDP. The browser adds the mediacnt-src section to the transmission request message, so that the transmission request message includes the identification information of the selected conference participant, and the browser sends the transmission request message to the conference server through the WebRTC application of the terminal.

Optionally, before the foregoing browser parses the conference participant attribute of the constraint object in the extended WebRTC interface, a step in which the browser stores the identification information of the selected conference participant in the conference participant attribute is further included. It may be understood that, in addition to the identification information of the selected conference participant, other related information about the conference participant may also be saved in the conference participant attribute. In this embodiment of the present disclosure, saving only the identification information is used as an example for description. In actual application, other related information about the conference participant may also be saved.

It should be noted that, in this embodiment of the present disclosure, an operator extends the browser and adds a function to the browser in advance, that is, a WebRTC interface of the browser and the SDP that is used when the browser runs are extended, and after the browser is extended, the function of the browser is added, so that the browser can run the extended interface and protocol.

Further, the operator extends the constraint object in the WebRTC interface of the browser and adds the conference participant attribute to the constraint object, where the conference participant attribute is used to save the identification information of the selected conference participant. The operator adds the function to a method for generating the transmission request message by the browser, so that the browser can extract a value of the conference participant attribute and store the extracted value in the conference participant list. The operator extends the content attribute in the SDP and adds a mediacnt-src section to store an identifier of the conference participant, so as to enable the browser to load the conference participant list into the mediacnt-src section, and add the mediacnt-src section to the transmission request message so that the transmission request message includes the identification information of the selected conference participant.

Optionally, before step 240 in this embodiment of the present disclosure, that the browser receives, using the WebRTC application, a transmission response message that is sent by the conference server according to the transmission request message is further included. The browser may determine, by using the received transmission response message, that a transmission connection is already established with the conference server, and that the conference server prepares to send the second media stream to the browser. A specific step is as follows:

The transmission response message that is sent by the conference server according to the transmission request message is received using the WebRTC application, so that the browser can determine that the transmission connection is already established with the conference server.

The browser receives, using the WebRTC application, the transmission response message that is sent by the conference server according to the transmission request message, so that the browser can determine that the transmission connection is already established with the conference server, and that the conference server prepares to send the second media stream to the browser.

Optionally, after step 240 in this embodiment of the present disclosure, a step in which the browser transmits the second media stream to the WebRTC application, so that the WebRTC application plays the second media stream is further included. By performing this step, the second media stream may be played to the user. A specific step is as follows:

The second media stream is transmitted to the WebRTC application, so that the WebRTC application plays the second media stream.

The browser transmits the second media stream to the WebRTC application, so that the WebRTC application plays the second media stream to the user, or the WebRTC application transmits the second media stream to another application, and the another application performs processing on the second media stream, for example, storing.

In conclusion, by applying the method for transmitting a media stream in a video conference according to this embodiment of the present disclosure, a browser of a terminal sends a transmission request message to a conference server according to an instruction of performing selection among video and audio information of all conference participants in the video conference, further receives video and audio information of a selected conference participant, and plays the received video and audio information using a WebRTC application, thereby resolving a problem in the prior art; the browser receives a video and audio of a specific conference participant, so that a video and audio of a conference participant that a user is not interested in can be shielded, thereby enhancing a function of a WebRTC video conference, improving user experience, saving network bandwidth, and reducing local resource consumption of the terminal.

To facilitate understanding of this embodiment of the present disclosure, the following uses a specific embodiment to provide further explanation with reference to the accompanying drawings, and the embodiment constitutes no limitation on this embodiment of the present disclosure.

Embodiment 2

Figure 3:
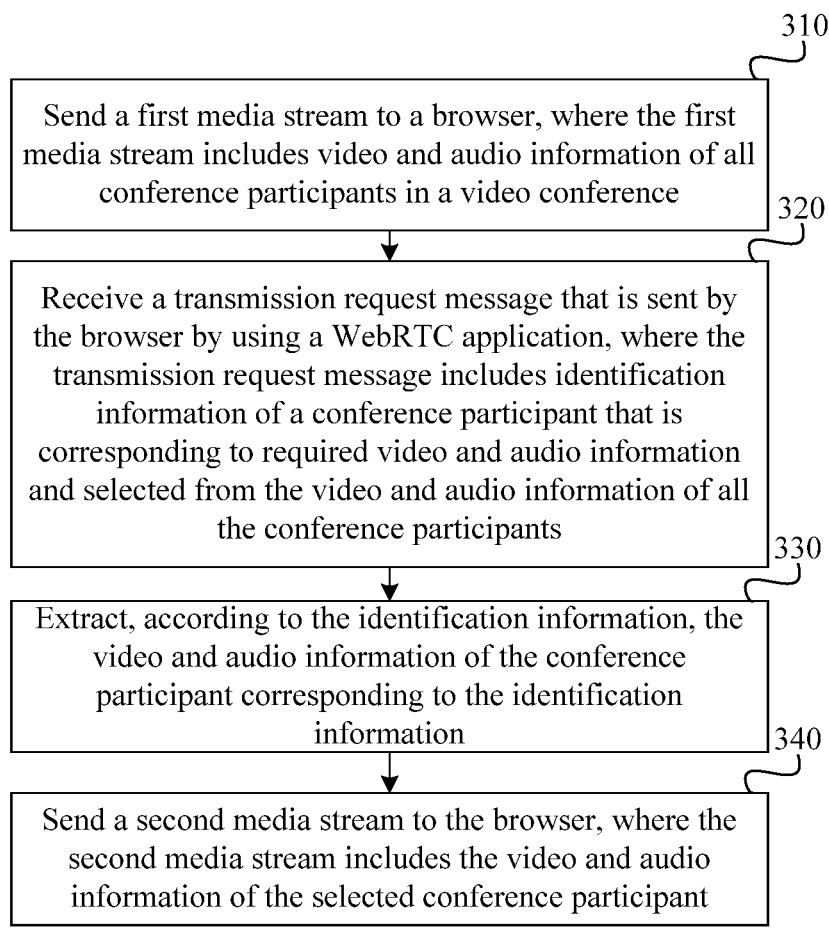
FIG. 3 is a flowchart of a method for transmitting a media stream in a video conference according to Embodiment 2 of the present disclosure.

The following uses FIG. 3 as an example to describe in detail a method for transmitting a media stream in a video conference according to Embodiment 2 of the present disclosure. FIG. 3 is a flowchart of the method for transmitting a media stream in a video conference according to Embodiment 2 of the present disclosure. In this embodiment of the present disclosure, an implementation body is a conference server, and the conference server is located in a communications network. As shown in FIG. 3, this embodiment further includes the following steps:

Step 310: Send a first media stream to a browser, where the first media stream includes video and audio information of all conference participants in a video conference.

Furthermore, in this embodiment of the present disclosure, when the conference server establishes a connection with the browser of a terminal, that is, when the browser accesses the conference server, the conference server sends the first media stream to the browser, where the first media stream includes the video and audio information of all the conference participants in the video conference.

Further, that the conference server establishes the connection with the browser is a prior art, which is briefly described in the foregoing embodiment and is not described herein again.

Step 320: Receive a transmission request message that is sent by the browser by using a WebRTC application, where the transmission request message includes identification information of a conference participant that is corresponding to required video and audio information and selected from the video and audio information of all the conference participants.

After sending the first media stream to the browser, the conference server receives the transmission request message that is sent by the browser using the WebRTC application, where the transmission request message includes the identification information of the conference participant that is corresponding to the required video and audio information and selected from the video and audio information of all the conference participants.

It may be understood that a detailed process in which the browser generates and sends the transmission request message is described in detail in the foregoing embodiment, which is not described herein again.

Step 330: Extract, according to the identification information, the video and audio information of the conference participant corresponding to the identification information.

After receiving the transmission request message, the conference server parses the transmission request message to extract the identification information of the conference participant included in the transmission request message, and extracts, according to the identification information, the video and audio information of the conference participant corresponding to the identification information.

Step 340: Send a second media stream to the browser, where the second media stream includes the video and audio information of the selected conference participant.

After extracting the video and audio information of the conference participant corresponding to the identification information, the conference server sends the second media stream to the browser, where the second media stream includes the video and audio information of the selected conference participant, so that the conference server can send video and audio information of a specific conference participant to the terminal according to selection of a user, thereby improving user experience, saving network bandwidth, and reducing local resource consumption of the terminal.

Optionally, after step 320 in this embodiment of the present disclosure, a step in which the conference server generates and sends a transmission response message according to the transmission request message is also included. By sending the transmission response message, the browser may determine that a transmission connection is already established with the conference server, and the conference server already prepares to send the second media stream to the browser. A specific step is as follows:

The transmission response message is generated according to the transmission request message.

The conference server generates the transmission response message according to the transmission request message, and invokes an extended WebRTC interface when generating the transmission response message, and the conference server sends the transmission response message to the browser using a connection that is already established between the extended WebRTC interface and the WebRTC application, so that the browser can determine that the transmission connection is already established with the conference server. The conference server extracts the identification information of the selected conference participant from the transmission request message according to the invoked extended WebRTC interface, and stores the identification information of the selected conference participant in a conference participant list.

It should be noted that, in this embodiment of the present disclosure, an operator extends the conference server and adds a function to the conference server in advance, that is, a WebRTC interface of the conference server is extended, and after the conference server is extended, the function of the conference server is added, so that the conference server can run the extended interface and an extended protocol.

Further, the operator extends the WebRTC interface of the conference server, and adds the function to a method for generating the transmission response message, so that the conference server can extract identification information of at least one conference participant from a mediacnt-src section in the transmission request message, and store the extracted identification information of the at least one conference participant in the conference participant list.

Optionally, the extracting, according to the identification information, the video and audio information of the conference participant corresponding to the identification information in step 330 in this embodiment of the present disclosure further includes the following:

The conference server extracts, according to the identification information that is of the conference participant selected by the user and stored in the conference participant list, a media tracking object of the corresponding conference participant from the extended WebRTC interface, where the media tracking object includes the video and audio information of the conference participant.

It should be noted that, in this embodiment of the present disclosure, the operator extends the WebRTC interface of the conference server and extends the media tracking object in the WebRTC interface, so that the media tracking object can store the video and audio information of the conference participant.

Optionally, the sending a second media stream to the browser, where the second media stream includes the video and audio information of the selected conference participant in step 340 in this embodiment of the present disclosure further includes the following:

The conference server carries the media tracking object in the second media stream, so that the second media stream includes the video and audio information of the selected conference participant.

In conclusion, by applying the method for transmitting a media stream in a video conference according to this embodiment of the present disclosure, a browser of a terminal sends a transmission request message to a conference server according to an instruction of performing selection among video and audio information of all conference participants in the video conference, further receives video and audio information of a selected conference participant, and plays the received video and audio information using a WebRTC application, thereby resolving a problem in the prior art. The browser receives a video and audio of a specific conference participant, so that a video and audio of a conference participant that a user is not interested in can be shielded, thereby enhancing a function of a WebRTC video conference, improving user experience, saving network bandwidth, and reducing local resource consumption of the terminal.

Figure 4A:
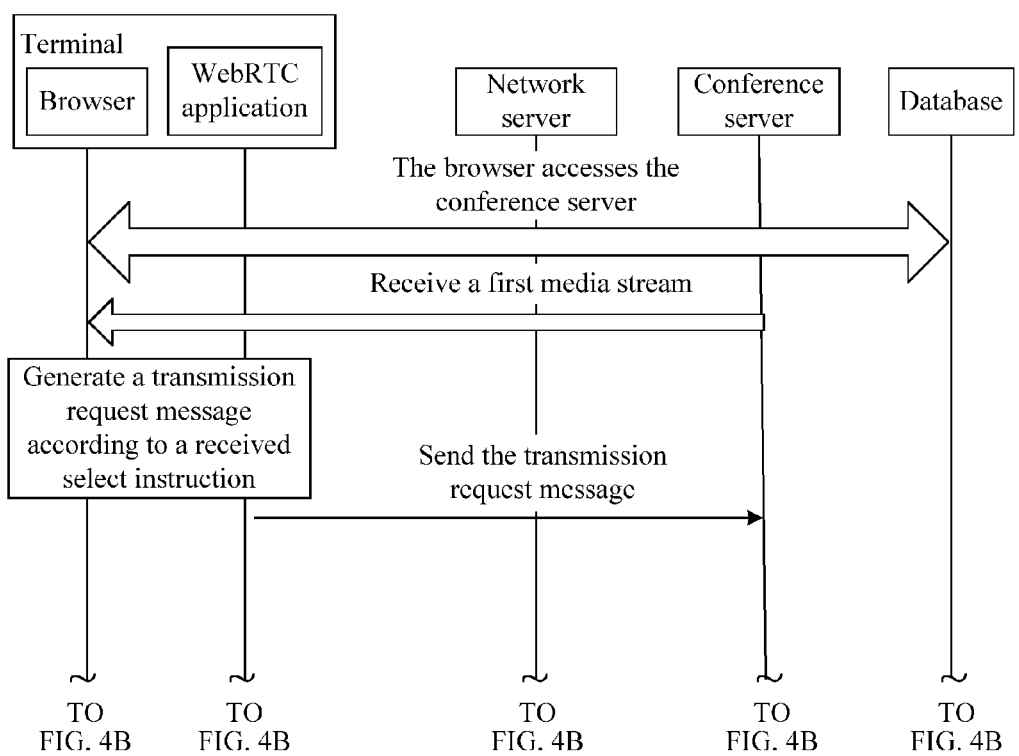
FIG. 4A and FIG. 4B are a signaling diagram of a method for transmitting a media stream in a video conference according to an embodiment of the present disclosure.
Figure 4B:
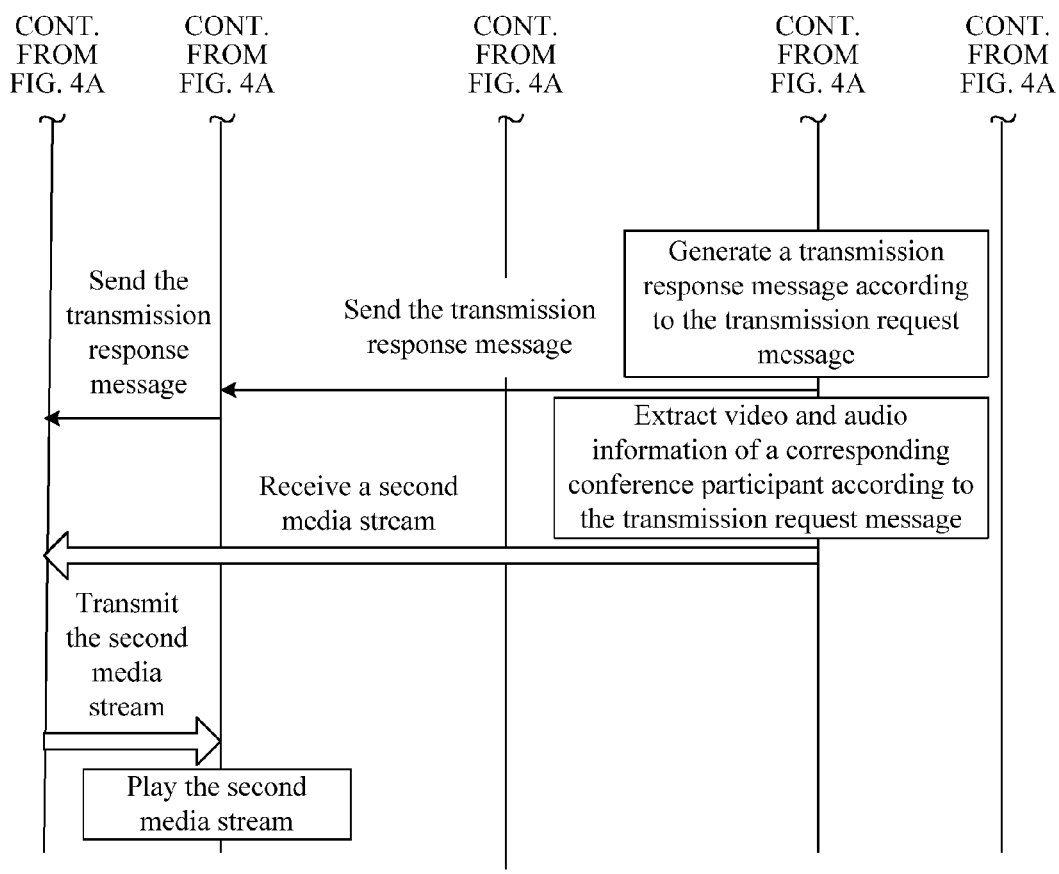

Further, FIG. 4A and FIG. 4B are a signaling diagram of a method for transmitting a media stream in a video conference according to an embodiment of the present disclosure. The signaling diagram shown in FIG. 4A and FIG. 4B are a process in which a browser, a WebRTC application, and a conference server perform media stream transmission, and the method in FIG. 4A and FIG. 4B for transmitting a media stream in a video conference may be performed according to the process described in the foregoing embodiment, which is not described herein again.

To facilitate understanding of this embodiment of the present disclosure, the following uses a specific embodiment to provide further explanation with reference to the accompanying drawings, and the embodiment constitutes no limitation on this embodiment of the present disclosure.

Embodiment 3

Figure 5:
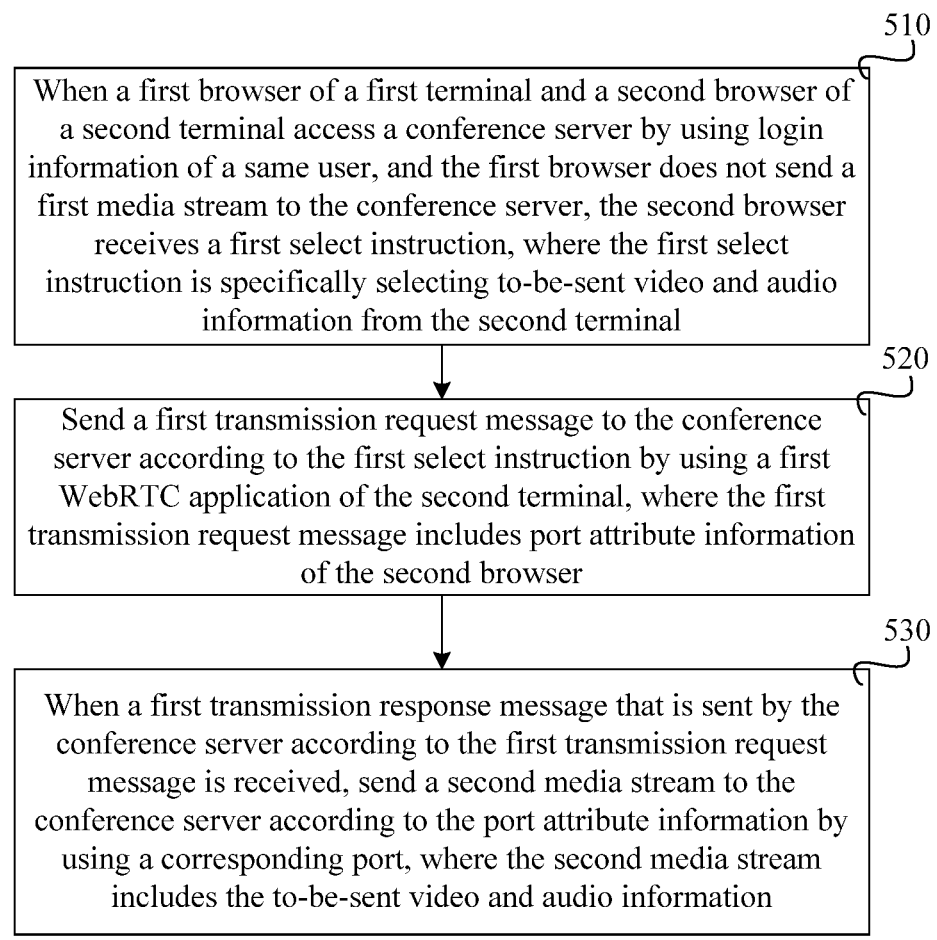
FIG. 5 is a flowchart of a method for transmitting a media stream in a video conference according to Embodiment 3 of the present disclosure.

The following uses FIG. 5 as an example to describe in detail a method for transmitting a media stream in a video conference according to Embodiment 3 of the present disclosure. FIG. 5 is a flowchart of the method for transmitting a media stream in a video conference according to Embodiment 3 of the present disclosure. Each conference site of the video conference includes a first terminal and a second terminal, and the first terminal and the second terminal belong to a same user, that is, a first browser of the first terminal and a second browser of the second terminal may access a conference server using login information of the same user. In this embodiment of the present disclosure, an implementation body is the second browser that is located in the second terminal. In this embodiment of the present disclosure, the terminal further refers to a mobile terminal such as a smartphone or a tablet computer, or a fixed terminal such as a personal computer or a smart television. As shown in FIG. 5, this embodiment further includes the following steps:

Step 510: When the first browser of the first terminal and the second browser of the second terminal access the conference server using the login information of the same user, and the first browser does not send a first media stream to the conference server, the second browser receives a first select instruction, where the first select instruction is selecting to-be-sent video and audio information from the second terminal.

Furthermore, in this embodiment of the present disclosure, when the first browser of the first terminal and the second browser of the second terminal access the conference server using the login information of the same user, that is, the first browser and the second browser separately establish a connection with the conference server, and when the first browser does not send the first media stream to the conference server, the second browser receives the first select instruction, where the first select instruction is entered by the user and the first select instruction is selecting, by the user, the to-be-sent video and audio information from video and audio information that is stored in the second terminal or is acquired in real time by the second terminal. In this embodiment of the present disclosure, the first media stream further includes video and audio information in the first terminal.

Further, that the first browser and the second browser access the conference server is a prior art, which is briefly described in the foregoing embodiment and is not described herein again.

It should be noted that, before the second browser receives the first select instruction, the first browser and the second browser may separately receive video and audio information of a selected conference participant from the conference server according to the foregoing embodiment.

In this embodiment of the present disclosure, the video and audio information that is acquired in real time by the second terminal further refers to real-time video and audio information acquired by using a camera and a microphone that are of the second terminal device itself.

Step 520: Send a first transmission request message to the conference server according to the first select instruction using a first WebRTC application of the second terminal, where the first transmission request message includes port attribute information of the second browser.

The second browser sends the first transmission request message to the conference server according to the first select instruction using the first WebRTC application of the second terminal, where the first transmission request message includes the port attribute information of the second browser.

Further, the port attribute information of the second browser further refers to a category of a port in the second browser, that is, a port only used for sending video information, a port only used for receiving video information, and a port used for sending and receiving audio information.

Step 530: When a first transmission response message that is sent by the conference server according to the first transmission request message is received, send a second media stream to the conference server according to the port attribute information using a corresponding port, where the second media stream includes the to-be-sent video and audio information.

Furthermore, when the second browser receives the first transmission response message that is sent by the conference server according to the first transmission request message, the second browser determines that a transmission connection is already established with the conference server, and the second browser sends the second media stream to the conference server according to the port attribute information using the corresponding port (that is, a port only for sending video information, or a port for sending and receiving audio information), where the second media stream includes the to-be-sent video and audio information, so that the first browser of the first terminal or the second browser of the second terminal can upload a video/audio to the conference server in the video conference, thereby improving user experience.

Optionally, before the second browser receives the first select instruction entered by the user in step 510 in this embodiment of the present disclosure, steps such as a step in which the second browser receives, from the conference server, the video and audio information of the conference participant selected by the user may further be included. Specific steps are as follows:

A third media stream sent by the conference server is received, where the third media stream includes video and audio information of all conference participants in the video conference.

Furthermore, when the second browser accesses the conference server, the second browser receives the third media stream sent by the conference server, where the third media stream includes the video and audio information of all the conference participants in the video conference.

A second select instruction is received, where the second select instruction is selecting, from the video and audio information of all the conference participants, a conference participant corresponding to required video and audio information.

After the second browser receives the third media stream sent by the conference server, the second browser parses the third media stream to extract the video and audio information of each conference participant, and displays the video and audio information of each conference participant on a user interface, and the second browser receives the second select instruction, where the select instruction is entered by the user and the second select instruction is selecting, by the user, the conference participant corresponding to the required video and audio information from the video and audio information that is of all the conference participants and displayed on the user interface, that is, selecting, by the user, the required conference participant according to the video and audio information that is of all the conference participants and displayed on the user interface.

In this embodiment of the present disclosure, the selected conference participant indicates that only video and audio information corresponding to the selected conference participant is subsequently received.

A second transmission request message is sent to the conference server according to the second select instruction by using the first WebRTC application, where the second transmission request message includes identification information of the selected conference participant.

The second browser sends the second transmission request message to the conference server according to the second select instruction using the first WebRTC application, where the second transmission request message includes the identification information of the selected conference participant. The identification information is used to determine the conference participant required by the user.

Further, when receiving the second select instruction, the second browser further extracts, according to the second select instruction, the identification information of the conference participant selected by the user, and adds the identification information to the second transmission request message.

A second transmission response message sent by the conference server is received using the first WebRTC application, where the second transmission response message is used for the second browser to determine not to send video and audio information in the second terminal to the conference server when the first browser sends the first media stream to the conference server exists.

The second browser receives, using the first WebRTC application, the second transmission response message that is sent by the conference server according to the second transmission request message, where the second transmission response message includes attribute information of the conference server (for example, media attribute information of the conference server) and the identification information of the selected conference participant, so that the second browser does not send the video and audio information in the second terminal to the conference server when determining that the fact in which the first browser sends the first media stream to the conference server exists, that is, in the video conference, the conference server receives video and audio information uploaded by only one browser.

A fourth media stream that is sent by the conference server according to the identification information is received, where the fourth media stream includes the video and audio information of the selected conference participant.

After sending the second transmission request message to the conference server, the second browser receives the fourth media stream that is sent by the conference server according to the identification information included in the second transmission request message, where the fourth media stream includes the video and audio information of the selected conference participant, so that the conference server sends video and audio information of a specific conference participant to the terminal according to selection of the user, thereby improving user experience, saving network bandwidth, and reducing local resource consumption of the terminal.

Optionally, before step 520 in this embodiment of the present disclosure, a step in which the second browser generates the first transmission request message according to the first select instruction is also included. A specific step is as follows:

The first transmission request message is generated according to the first select instruction.

The second browser receives, according to the first select instruction, a create instruction sent by the first WebRTC application, according to the create instruction, the second browser invokes an extended WebRTC interface, and determines a video sending attribute value and an audio sending attribute value that are of a constraint object in the extended WebRTC interface, when the video sending attribute value is true, the second browser sets an attribute of a first video port that has received video information to a port only for receiving a video, and sets an attribute of a second video port that has not received video information to a port only for sending a video, when the audio sending attribute value is true, the second browser sets an attribute of an audio port to a transmit and receive port. The second browser adds information about the set port attribute to the first transmission request message, so that the first transmission request message includes the port attribute information of the second browser.

It should be noted that, in this embodiment of the present disclosure, an operator extends the second browser and adds a function to the second browser in advance, that is, a WebRTC interface of the second browser is extended, and after the second browser is extended, the function of the browser is added, so that the second browser can run the extended interface and an extended protocol.

Further, the operator extends the constraint object in the extended WebRTC interface of the second browser, and adds the video sending attribute value and the audio sending attribute value to the constraint object, where the attribute value is used to set a port attribute of the second browser and the attribute value is true or false. The operator adds the function to a method for generating the first transmission request message by the second browser, so that the second browser can determine the attribute value, set the port attribute of the second browser itself, and add the information about the set port attribute to the first transmission request message so that the transmission request message includes the port attribute information of the second browser.

It may be understood that, the second browser sets the port attribute of the second browser itself, so that the second browser can conveniently manage a port of the second browser itself, and correspondingly send the media stream according to the port attribute when sending the media stream to the conference server, and in addition, the conference server can also determine the port attribute of the second browser and correspondingly receive the media stream according to the port attribute when receiving the media stream sent by the conference server, thereby improving a port utilization ratio.

In conclusion, by applying the method for transmitting a media stream in a video conference according to this embodiment of the present disclosure, multiple terminals that belong to a same user may access a conference server and receive video and audio information of a specific conference participant at the same time, when a first browser does not send a first media stream to the conference server, a second browser generates a first transmission request message according to a received select instruction, where the first transmission request message includes port attribute information of the second browser, and sends a second media stream to the conference server according to the port attribute information, thereby resolving a problem in the prior art. In addition, the user participates in a same video conference using two or more than two terminal devices, each terminal receives video and audio information of a specific conference participant, and the user can randomly switch the terminal to upload local video and audio information, thereby enhancing a function of a WebRTC video conference, improving user experience, saving network bandwidth, and reducing local resource consumption of the terminal.

To facilitate understanding of this embodiment of the present disclosure, the following uses a specific embodiment to provide further explanation with reference to the accompanying drawings, and the embodiment constitutes no limitation on this embodiment of the present disclosure.

Embodiment 4

Figure 6:
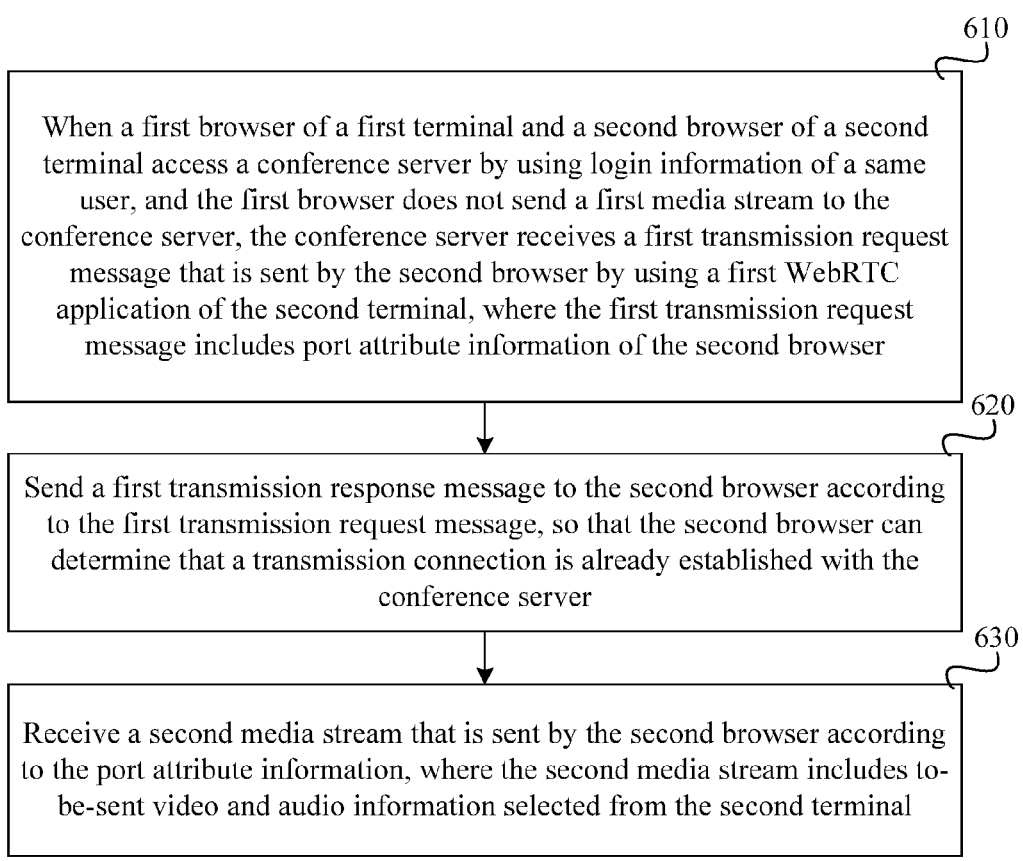
FIG. 6 is a flowchart of a method for transmitting a media stream in a video conference according to Embodiment 4 of the present disclosure.

The following uses FIG. 6 as an example to describe in detail a method for transmitting a media stream in a video conference according to Embodiment 4 of the present disclosure, and FIG. 6 is a flowchart of the method for transmitting a media stream in a video conference according to Embodiment 4 of the present disclosure. In this embodiment of the present disclosure, an implementation body is a conference server, and the conference server is located in a communications network. As shown in FIG. 6, this embodiment further includes the following steps:

Step 610: When a first browser of a first terminal and a second browser of a second terminal access the conference server by using login information of a same user, and the first browser does not send a first media stream to the conference server, the conference server receives a first transmission request message that is sent by the second browser by using a first WebRTC application of the second terminal, where the first transmission request message includes port attribute information of the second browser.

Furthermore, in this embodiment of the present disclosure, when the first browser of the first terminal and the second browser of the second terminal access the conference server using the login information of the same user, that is, both the first browser and the second browser access the conference server, and when the first browser does not send the first media stream to the conference server, the conference server receives the first transmission request message that is sent by the second browser using the first WebRTC application of the second terminal, where the first transmission request message includes the port attribute information of the second browser. In this embodiment of the present disclosure, the first media stream further includes video and audio information stored in the first terminal, and the first terminal and the second terminal are used by the same user.

Further, that the conference server establishes a connection with the first browser and the second browser is a prior art, which is briefly described in the foregoing embodiment and is not described herein again.

It should be noted that, in this embodiment of the present disclosure, the port attribute information of the second browser further refers to a category of a port in the second browser, that is, a port only used for sending video information, a port only used for receiving video information, and a port used for sending and receiving audio information.

Step 620: Send a first transmission response message to the second browser according to the first transmission request message, so that the second browser can determine that a transmission connection is already established with the conference server.

After receiving the first transmission request message, the conference server parses the first transmission request message to extract the port attribute information of the second browser included in the first transmission request message. The conference server determines categories of all ports of the second browser according to the transmission request message (that is, when subsequently sending/receiving a media stream, the conference server determines that the media stream is sent to/received from a corresponding port according to the port attribute information in the second browser), and the conference server sends the first transmission response message to the second browser.

Further, the first transmission response message is used for the second browser to determine that the transmission connection is already established with the conference server.

Step 630: Receive a second media stream that is sent by the second browser according to the port attribute information, where the second media stream includes to-be-sent video and audio information selected from the second terminal.

The conference server receives the second media stream that is sent by the second browser according to the port attribute information (that is, a port only for sending video information, or a port for sending and receiving audio information), where the second media stream includes the to-be-sent video and audio information selected by the user from video and audio information that is stored in the second terminal or acquired in real time by the second terminal, so that the first browser of the first terminal or the second browser of the second terminal can upload a video/audio to the conference server in a video conference, thereby improving user experience.

Optionally, before the conference server receives the first transmission request message that is sent by the second browser by using the first WebRTC application of the second terminal in step 610 in this embodiment of the present disclosure, a step in which the conference server sends video and audio information of a selected conference participant to the second browser is also included. Specific steps are as follows:

A third media stream is sent to the second browser, where the third media stream includes video and audio information of all conference participants in the video conference.

Furthermore, in this embodiment of the present disclosure, after the conference server establishes the connection with the second browser, that is, after the second browser accesses the conference server, the conference server sends the third media stream to the second browser, where the third media stream includes the video and audio information of all the conference participants in the video conference.

Further, that the conference server establishes the connection with the second browser is a prior art, which is briefly described in the foregoing embodiment and is not described herein again.

A second transmission request message that is sent by the second browser using the first WebRTC application is received, where the second transmission request message includes identification information of a conference participant that is corresponding to required video and audio information and selected from the video and audio information of all the conference participants.

After sending the third media stream to the second browser, the conference server receives the second transmission request message that is sent by the second browser using the first WebRTC application, where the second transmission request message includes the identification information of the conference participant that is corresponding to the required video and audio information and selected from the video and audio information of all the conference participants.

It may be understood that a detailed process in which the browser generates and sends the transmission request message is described in detail in the foregoing embodiment, which is not described herein again.

According to the second transmission request message, an extended WebRTC interface is invoked, and whether the first browser is sending the media stream is determined.

After receiving the second transmission request message, the conference server parses the second transmission request message to extract the identification information that is of the conference participant and included in the second transmission request message, invokes the extended WebRTC interface, and determines whether the first browser is sending the media stream.

Further, the conference server determines, using user connection information (such as user identification information, connection identification information, or information about whether a video and audio are being uploaded) that is previously stored in a database, whether the first browser is sending the media stream.

It should be noted that, when each browser accesses the conference server, the conference server creates a data structure to save connection information of a user corresponding to each browser, and stores the created user connection information in the database, where the database is located in the communications network.

If the first browser is sending the media stream, a port attribute of the conference server itself is set to a send-only port.

Furthermore, if the first browser is sending the media stream to the conference server, the conference server sets the port attribute of the conference server itself to a send-only port, that is, a non-receiving port.

Information about the set port attribute is added to a second transmission response message, and the second transmission response message is sent to the second browser using the first WebRTC application, where the second transmission response message is used for the second browser to determine not to send video and audio information in the second terminal to the conference server when the first browser sends the media stream to the conference server exists.

The conference server adds the information about the set port attribute to the second transmission response message, and sends the second transmission response message to the second browser using the first WebRTC application, where the second transmission response message is used for the second browser to determine not to send the video and audio information in the second terminal to the conference server when the fact in which the first browser sends the media stream to the conference server exists.

It should be noted that, in this embodiment of the present disclosure, an operator extends the conference server and adds a function to the conference server in advance, that is, a WebRTC interface of the conference server is extended, and after the conference server is extended, the function of the conference server is added, so that the conference server can run the extended interface and an extended protocol.

Further, the operator extends the WebRTC interface of the conference server, and adds the function in a method for generating the second transmission response message, so that the conference server can determine whether the first browser is sending the media stream, and if the first browser is sending the media stream, the conference server sets the port attribute of the conference server itself to a send-only port, and adds the information about the set port attribute to the second transmission response message.

The video and audio information of the conference participant corresponding to the identification information is extracted according to the identification information.

The conference server extracts, according to the identification information that is of the conference participant and extracted from the second transmission request message in the foregoing optional step, the video and audio information of the conference participant corresponding to the identification information.

Further, the conference server may extract identification information of at least one conference participant from the transmission request message, and the conference server extracts, according to the identification information of the at least one conference participant, a media tracking object of the corresponding conference participant from the extended WebRTC interface, where the media tracking object includes the video and audio information of the conference participant.

It should be noted that, in this embodiment of the present disclosure, the operator extends the WebRTC interface of the conference server and extends the media tracking object in the WebRTC interface, so that the media tracking object can store the video and audio information of the conference participant.

A fourth media stream is sent to the second browser, where the fourth media stream includes the video and audio information of the selected conference participant.

After extracting the video and audio information of the conference participant corresponding to the identification information, the conference server sends the fourth media stream to the second browser, where the fourth media stream includes the video and audio information of the selected conference participant, so that the conference server can send video and audio information of a specific conference participant to the terminal according to selection of the user, thereby improving user experience, saving network bandwidth, and reducing local resource consumption of the terminal.

Optionally, after the second media stream that is sent by the second browser according to the port attribute information is received in step 630 in this embodiment of the present disclosure, a step in which the conference server sends a media stream to the second browser is also included. By performing this step, a media stream can be transferred between the second browser and the conference server, so that the user can transfer a media stream to the conference server by using different terminals in a video conference, thereby improving user experience. A specific step is as follows:

A fifth media stream is sent to a corresponding port of the second browser according to the port attribute information.

The conference server sends the fifth media stream to the corresponding port of the second browser according to the port attribute information of the second browser included in the first transmission request message that is received in step 610. In this embodiment of the present disclosure, the fifth media stream includes the video and audio information of the selected conference participant or the video and audio information of all the conference participants.

Further, the conference server sends video information to the port that is of the second browser and only used for receiving video information, and sends audio information to the port for sending and receiving audio information.

Optionally, because the media stream is transferred between the second browser and the conference server in the foregoing optional step, in this case, to reduce a limitation on network bandwidth, the conference server further performs steps to stop the first browser from sending the media stream.

The extended WebRTC interface is invoked, and a video receiving attribute value and an audio receiving attribute value that are of a constraint object in the extended WebRTC interface are determined.

After the media stream is transferred between the conference server and the second browser, the conference server invokes the extended WebRTC interface, and determines the video receiving attribute value and the audio receiving attribute value that are of the constraint object in the extended WebRTC interface.

When the video receiving attribute value is true, an attribute of a video port that has received video information is set to a port only for sending a video.

Furthermore, when the video receiving attribute value is true, the conference server sets the attribute of the video port that has received video information to the port only for sending a video.

When the audio receiving attribute value is true, an attribute of an audio port that has received audio information is set to a port only for sending audio.

Furthermore, when the audio receiving attribute value is true, the conference server sets the attribute of the audio port that has received audio information to the port only for sending audio.

The set port attribute is added to a third transmission request message, and the third transmission request message is sent to the first browser, where the third transmission request message is used for the first browser to determine not to send video and audio information in the first terminal to the conference server.

The conference server adds the set port attribute to the third transmission request message, and sends the third transmission request message to the first browser, where the third transmission request message is used for the first browser to determine not to send the video and audio information in the first terminal to the conference server.

After receiving the third transmission request message, the first browser parses the third transmission request message to extract the port attribute of the conference server included in the third transmission request message, determines that the conference server refuses to receive video and audio information sent by the first browser itself, and sends the third transmission response message to the conference server. In this case, the conference server determines to only send a media stream to the first browser, and not to receive a media stream sent by the first browser, so that different terminals can be used to upload a media stream to the conference server in a video conference.

It should be noted that, in this embodiment of the present disclosure, an operator extends the conference server and adds a function to the conference server in advance, that is, a WebRTC interface of the conference server is extended, and after the conference server is extended, the function of the conference server is added, so that the conference server can run the extended interface and an extended protocol.

Further, the operator extends the constraint object in the extended WebRTC interface of the conference server, and adds the video receiving attribute value and the audio receiving attribute value to the constraint object, where the attribute value is used to set a port attribute of the conference server and the attribute value is true or false; the operator adds the function in a method for generating the third transmission request message by the conference server, so that the second browser can determine the attribute value, set the port attribute of the second browser itself, and add the set port attribute to the third transmission request message so that the third transmission request message includes the information about the port attribute of the second browser.

In conclusion, by applying the method for transmitting a media stream in a video conference according to this embodiment of the present disclosure, multiple terminals that belong to a same user may access a conference server and receive video and audio information of a specific conference participant at the same time; when a first browser does not send a first media stream to the conference server, a second browser generates a first transmission request message according to a received select instruction, where the first transmission request message includes port attribute information of the second browser, and sends a second media stream to the conference server according to the port attribute information, thereby resolving a problem in the prior art. In addition, the user participates in a same video conference by using two or more than two terminal devices, each terminal receives video and audio information of a specific conference participant, and the user can randomly switch the terminal to upload video and audio information, thereby enhancing a function of a WebRTC video conference, improving user experience, saving network bandwidth, and reducing local resource consumption of the terminal.

Figure 7A:
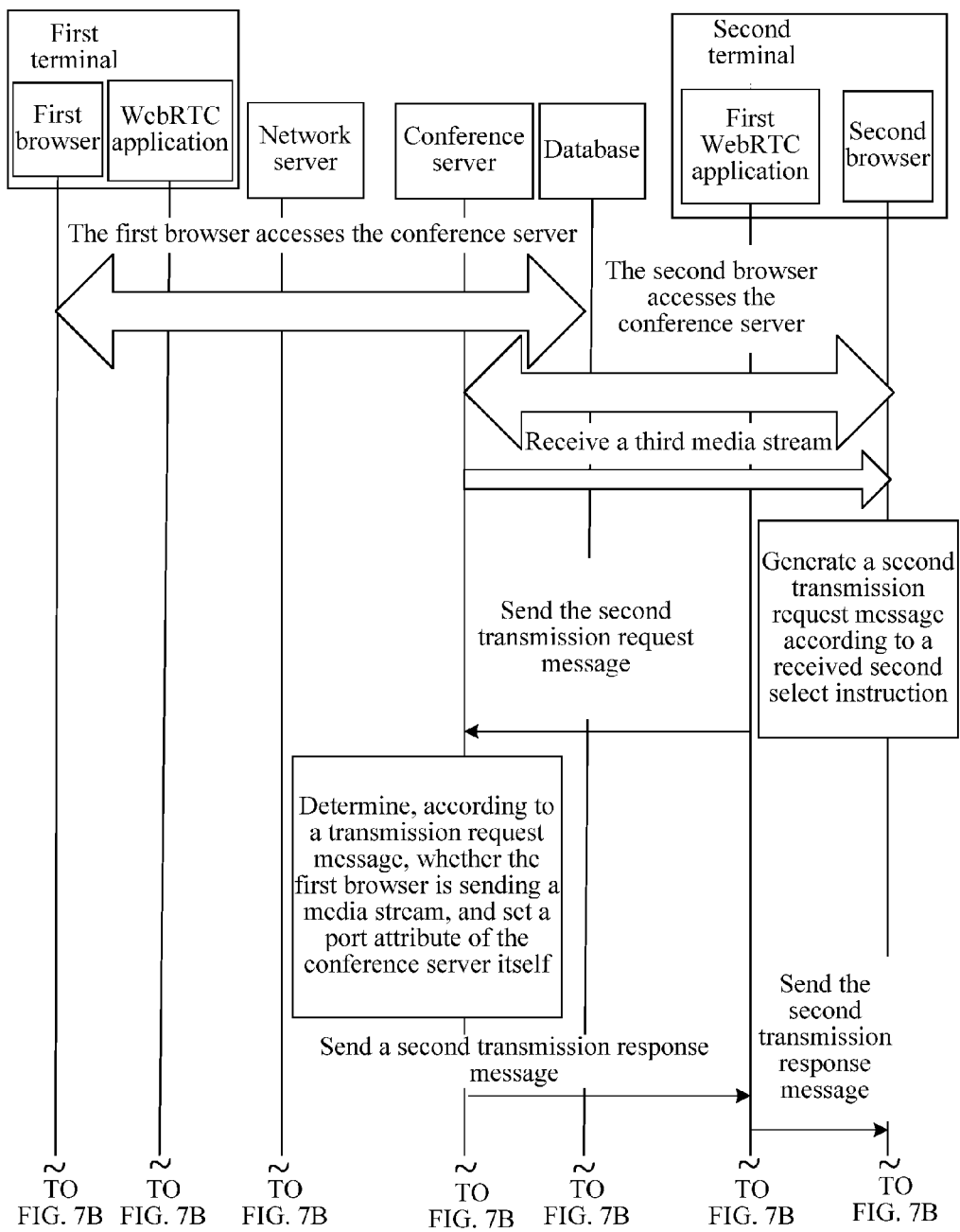
FIG. 7A and FIG. 7B are a signaling diagram of another method for transmitting a media stream in a video conference according to an embodiment of the present disclosure.
Figure 7B:
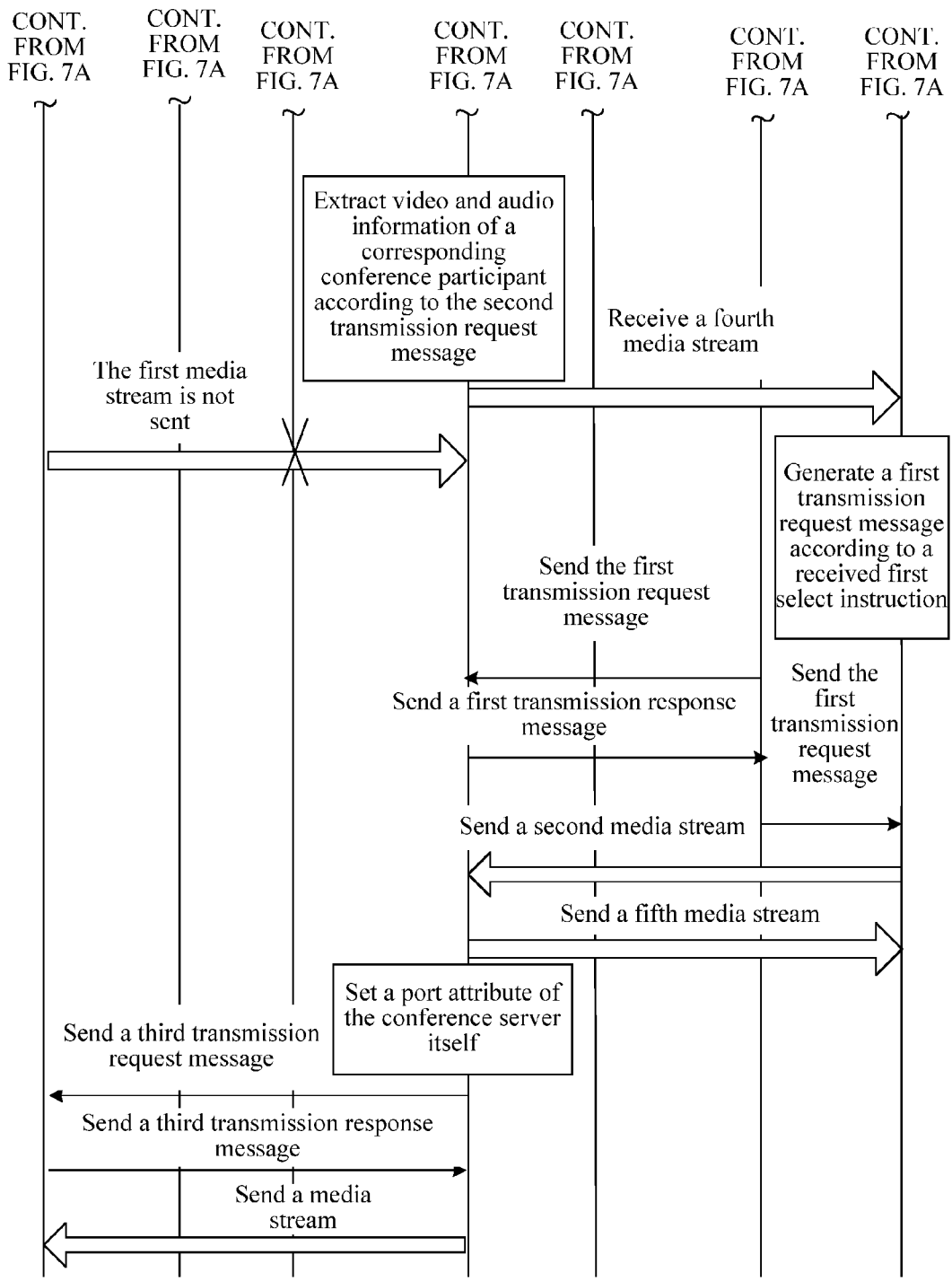

Further, FIG. 7A and FIG. 7B are a signaling diagram of another method for transmitting a media stream in a video conference according to an embodiment of the present disclosure. The signaling diagram shown in FIG. 7A and FIG. 7B are a process in which multiple browsers, a WebRTC application, and a conference server perform media stream transmission, and the method in FIG. 7A and FIG. 7B for transmitting a media stream in a video conference may be performed according to the process described in the foregoing embodiment, which is not described herein again.

Embodiment 5

Figure 8:
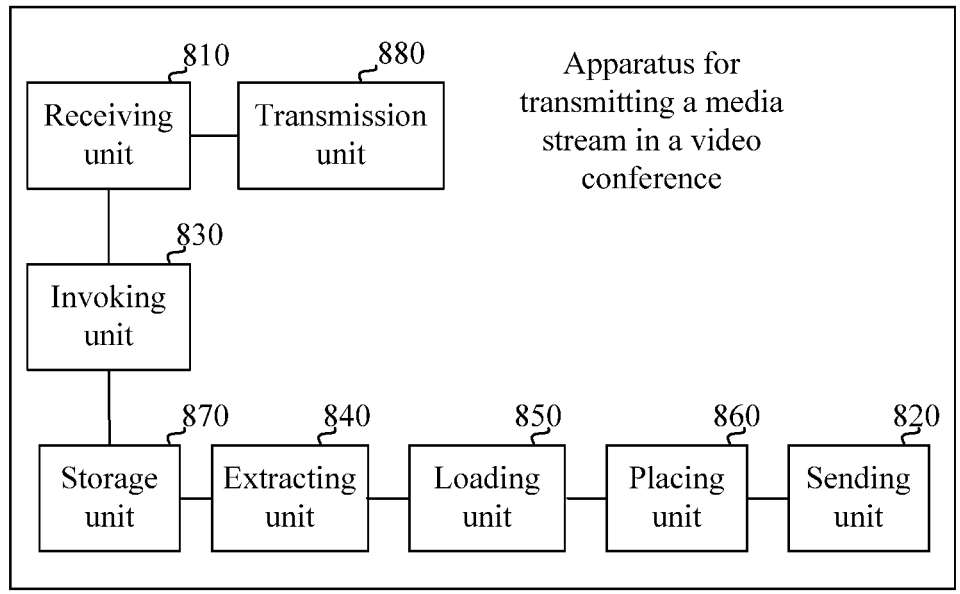
FIG. 8 is a structural diagram of an apparatus for transmitting a media stream in a video conference according to Embodiment 5 of the present disclosure.

Accordingly, Embodiment 5 of the present disclosure further provides an apparatus for transmitting a media stream in a video conference, so as to implement the method for transmitting a media stream in a video conference according to Embodiment 1. As shown in FIG. 8, the transmission apparatus is located in a terminal and the transmission apparatus includes: a receiving unit 810 and a sending unit 820.

The receiving unit 810 is configured to receive a first media stream sent by a conference server, where the first media stream includes video and audio information of all conference participants in the video conference.

The receiving unit 810 is further configured to receive a select instruction, where the select instruction is selecting, from the video and audio information of all the conference participants, a conference participant corresponding to required video and audio information.

The sending unit 820 is configured to send a transmission request message to the conference server according to the select instruction using a WebRTC application, where the transmission request message includes identification information of the selected conference participant.

The receiving unit 810 is further configured to receive a second media stream that is sent by the conference server according to the identification information, where the second media stream includes the video and audio information of the selected conference participant.

The receiving unit 810 is further configured to receive, according to the select instruction, a create instruction sent by the WebRTC application.

The transmission apparatus further includes: an invoking unit 830 configured to: according to the create instruction, invoke an extended WebRTC interface, and parse a conference participant attribute of a constraint object in the extended WebRTC interface and an extracting unit 840 configured to extract the identification information of the selected conference participant from the conference participant attribute, and store each piece of the identification information of the conference participant in a conference participant list.

The invoking unit 830 is further configured to invoke a content attribute in an extended SDP.

The transmission apparatus further includes: a loading unit 850 configured to load the conference participant list into a mediacnt-src section of the content attribute in the extended SDP and placing unit 860 configured to add the mediacnt-src section to the transmission request message, so that the transmission request message includes the identification information of the selected conference participant.

The sending unit 820 is further configured to send the transmission request message to the conference server by using the WebRTC application.

The apparatus further includes: a storage unit 870 configured to store the identification information of the selected conference participant in the conference participant attribute.

The receiving unit 810 is further configured to receive, using the WebRTC application, a transmission response message that is sent by the conference server according to the transmission request message, so as to determine that a transmission connection is already established with the conference server.

The transmission apparatus further includes: a transmission unit 880 configured to transmit the second media stream to the WebRTC application, so that the WebRTC application plays the second media stream.

In conclusion, by applying the apparatus for transmitting a media stream in a video conference according to this embodiment of the present disclosure, a browser of a terminal sends a transmission request message to a conference server according to an instruction of performing selection among video and audio information of all conference participants in the video conference, further receives video and audio information of a selected conference participant, and plays the received video and audio information using a WebRTC application, thereby resolving a problem in the prior art; the browser receives a video and audio of a specific conference participant, so that a video and audio of a conference participant that a user is not interested in can be shielded, thereby enhancing a function of a WebRTC video conference, improving user experience, saving network bandwidth, and reducing local resource consumption of the terminal.

Embodiment 6

Figure 9:
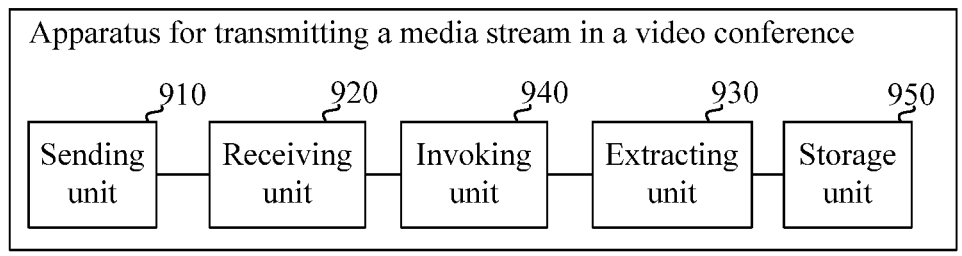
FIG. 9 is a structural diagram of an apparatus for transmitting a media stream in a video conference according to Embodiment 6 of the present disclosure.

Accordingly, Embodiment 6 of the present disclosure further provides an apparatus for transmitting a media stream in a video conference, so as to implement the method for transmitting a media stream in a video conference according to Embodiment 2. As shown in FIG. 9, the transmission apparatus includes: a sending unit 910, a receiving unit 920, and an extracting unit 930.

The sending unit 910 is configured to send a first media stream to a browser, where the first media stream includes video and audio information of all conference participants in the video conference.

The receiving unit 920 is configured to receive a transmission request message that is sent by the browser using a WebRTC application, where the transmission request message includes identification information of a conference participant that is corresponding to required video and audio information and selected from the video and audio information of all the conference participants.

The extracting unit 930 is configured to extract, according to the identification information, the video and audio information of the conference participant corresponding to the identification information.

The sending unit 910 is further configured to send a second media stream to the browser, where the second media stream includes the video and audio information of the selected conference participant.

The transmission apparatus further includes: an invoking unit 940 configured to invoke an extended WebRTC interface.

The extracting unit 930 is further configured to extract the identification information of the selected conference participant from the transmission request message according to the invoked extended WebRTC interface.

The apparatus further includes: a storage unit 950 configured to store the identification information of the selected conference participant in a conference participant list.

The sending unit 910 is further configured to send a transmission response message to the browser using a connection that is established between the extended WebRTC interface and the WebRTC application, so that the browser can determine that a transmission connection is already established with the conference server.

The extracting unit 930 is further configured to extract a media tracking object of the corresponding conference participant from the extended WebRTC interface according to the identification information that is of the selected conference participant and stored in the conference participant list by the storage unit, where the media tracking object includes the video and audio information of the conference participant.

The sending unit 910 is further configured to add the media tracking object to the second media stream, so that the second media stream includes the video and audio information of the selected conference participant.

In conclusion, by applying the apparatus for transmitting a media stream in a video conference according to this embodiment of the present disclosure, a browser of a terminal sends a transmission request message to a conference server according to an instruction of performing selection among video and audio information of all conference participants in the video conference, further receives video and audio information of a selected conference participant, and plays the received video and audio information using a WebRTC application, thereby resolving a problem in the prior art. The browser receives a video and audio of a specific conference participant, so that a video and audio of a conference participant that a user is not interested in can be shielded, thereby enhancing a function of a WebRTC video conference, improving user experience, saving network bandwidth, and reducing local resource consumption of the terminal.

Embodiment 7

Figure 10:
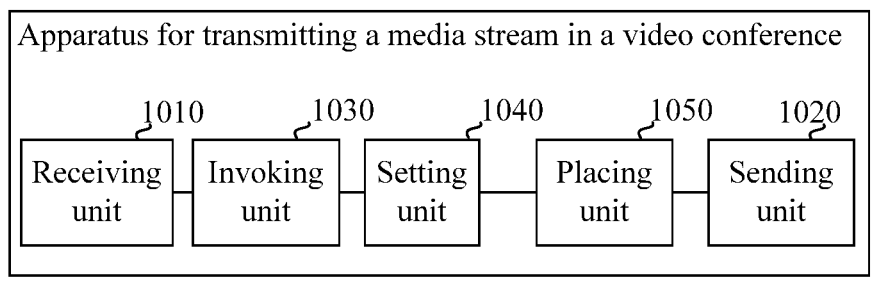
FIG. 10 is a structural diagram of an apparatus for transmitting a media stream in a video conference according to Embodiment 7 of the present disclosure.

Accordingly, Embodiment 7 of the present disclosure further provides an apparatus for transmitting a media stream in a video conference, so as to implement the method for transmitting a media stream in a video conference according to Embodiment 3. As shown in FIG. 10, each conference site in the video conference includes a first terminal and a second terminal, the transmission apparatus is located in the second terminal, and the transmission apparatus includes: a receiving unit 1010 and a sending unit 1020.

The receiving unit 1010 is configured to receive a first select instruction when a browser of the first terminal and the transmission apparatus access a conference server using login information of a same user and the browser does not send a first media stream to the conference server, where the first select instruction is selecting to-be-sent video and audio information from the second terminal.

The sending unit 1020 is configured to send a first transmission request message to the conference server according to the first select instruction by using a first WebRTC application of the second terminal, where the first transmission request message includes port attribute information of the transmission apparatus.

The sending unit 1020 is further configured to: when a first transmission response message that is sent by the conference server according to the first transmission request message is received, send a second media stream to the conference server according to the port attribute information by using a corresponding port, where the second media stream includes the to-be-sent video and audio information.

The receiving unit 1010 is further configured to receive a third media stream sent by the conference server, where the third media stream includes video and audio information of all conference participants in the video conference.

The receiving unit 1010 is further configured to receive a second select instruction, where the second select instruction is selecting, from the video and audio information of all the conference participants, a conference participant corresponding to required video and audio information.

The sending unit 1020 is further configured to send a second transmission request message to the conference server according to the second select instruction by using the first WebRTC application, where the second transmission request message includes identification information of the selected conference participant.

The receiving unit 1010 is further configured to receive, using the first WebRTC application, a second transmission response message sent by the conference server, where the second transmission response message is used for the transmission apparatus to determine not to send video and audio information in the second terminal to the conference server when the browser sends the first media stream to the conference server exists.

The receiving unit 1010 is further configured to receive a fourth media stream that is sent by the conference server according to the identification information, where the fourth media stream includes the video and audio information of the selected conference participant.

The transmission apparatus further includes that: the receiving unit 1010 is further configured to receive, according to the first select instruction, a create instruction sent by the first WebRTC application.

The transmission apparatus further includes: an invoking unit 1030 configured to: according to the create instruction, invoke an extended WebRTC interface, and determine a video sending attribute value and an audio sending attribute value that are of a constraint object in the extended WebRTC interface, and a setting unit 1040 configured to: when the video sending attribute value is true, set an attribute of a first video port that has received video information to a port only for receiving a video, and set an attribute of a second video port that has not received video information to a port only for sending a video.

The setting unit 1040 is further configured to, when the audio sending attribute value is true, set an attribute of an audio port to a transmit and receive port.

The transmission apparatus further includes: a placing unit 1050 configured to add information about the set port attribute to the first transmission request message, so that the first transmission request message includes the port attribute information of the transmission apparatus.

The sending unit 1020 is further configured to send the first transmission request message to the conference server by using the first WebRTC application of the second terminal.

In conclusion, by applying the apparatus for transmitting a media stream in a video conference according to this embodiment of the present disclosure, multiple terminals that belong to a same user may access a conference server and receive video and audio information of a specific conference participant at the same time, when a first browser does not send a first media stream to the conference server, a second browser generates a first transmission request message according to a received select instruction, where the first transmission request message includes port attribute information of the second browser, and sends a second media stream to the conference server according to the port attribute information, thereby resolving a problem in the prior art. In addition, the user participates in a same video conference using two or more than two terminal devices, each terminal receives video and audio information of a specific conference participant, and the user can randomly switch the terminal to upload local video and audio information, thereby enhancing a function of a WebRTC video conference, improving user experience, saving network bandwidth, and reducing local resource consumption of the terminal.

Embodiment 8

Figure 11:
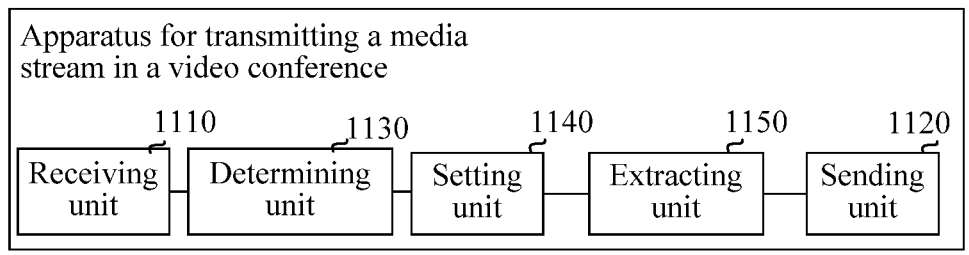
FIG. 11 is a structural diagram of an apparatus for transmitting a media stream in a video conference according to Embodiment 8 of the present disclosure.

Accordingly, Embodiment 8 of the present disclosure further provides an apparatus for transmitting a media stream in a video conference, so as to implement the method for transmitting a media stream in a video conference according to Embodiment 4. As shown in FIG. 11, the transmission apparatus includes: a receiving unit 1110 and a sending unit 1120.

The receiving unit 1110 is configured to: when a first browser of a first terminal and a second browser of a second terminal access the transmission apparatus using login information of a same user, and the first browser does not send a first media stream to the transmission apparatus, receive a first transmission request message that is sent by the second browser using a first WebRTC application of the second terminal, where the first transmission request message includes port attribute information of the second browser.

The sending unit 1120 is configured to send a first transmission response message to the second browser according to the first transmission request message, so that the second browser can determine that a transmission connection is already established with the transmission apparatus.

The receiving unit 1110 is further configured to receive a second media stream that is sent by the second browser according to the port attribute information, where the second media stream includes to-be-sent video and audio information selected from the second terminal.

The sending unit 1120 is further configured to send a third media stream to the second browser, where the third media stream includes video and audio information of all conference participants in the video conference.

The receiving unit 1110 is further configured to receive a second transmission request message that is sent by the second browser using the first WebRTC application, where the second transmission request message includes identification information of a conference participant that is corresponding to required video and audio information and selected from the video and audio information of all the conference participants.

The transmission apparatus further includes: a determining unit 1130 configured to: according to the second transmission request message, invoke an extended WebRTC interface and determine whether the first browser is sending the media stream, and a setting unit 1140 configured to, if the first browser is sending the media stream, set a port attribute of the transmission apparatus to a send-only port.

The sending unit 1120 is further configured to add information about the set port attribute to a second transmission response message, and send the second transmission response message to the second browser using the first WebRTC application, where the second transmission response message is used for the second browser to determine not to send video and audio information in the second terminal to the transmission apparatus when the first browser sends the media stream to the transmission apparatus exists.

The transmission apparatus further includes: an extracting unit 1150 configured to extract, according to the identification information, the video and audio information of the conference participant corresponding to the identification information.

The sending unit 1120 is further configured to send a fourth media stream to the second browser, where the fourth media stream includes the video and audio information of the selected conference participant.

The sending unit 1120 is further configured to send a fifth media stream to a corresponding port of the second browser according to the port attribute information.

The determining unit 1130 is further configured to invoke the extended WebRTC interface, and determine a video receiving attribute value and an audio receiving attribute value that are of a constraint object in the extended WebRTC interface.

The setting unit 1140 is further configured to: when a result of the determining by the determining unit is that the video receiving attribute value is true, set an attribute of a video port that has received video information to a port only for sending a video.

The setting unit 1140 is further configured to: when the result of the determining by the determining unit is that the audio receiving attribute value is true, set an attribute of an audio port that has received audio information to a port only for sending audio.

The sending unit 1120 is further configured to add information about the set port attribute to a third transmission request message, and send the third transmission request message to the first browser, where the third transmission request message is used for the first browser to determine not to send video and audio information in the first terminal to the transmission apparatus.

In conclusion, by applying the apparatus for transmitting a media stream in a video conference according to this embodiment of the present disclosure, multiple terminals that belong to a same user may access a conference server and receive video and audio information of a specific conference participant at the same time, when a first browser does not send a first media stream to the conference server, a second browser generates a first transmission request message according to a received select instruction, where the first transmission request message includes port attribute information of the second browser, and sends a second media stream to the conference server according to the port attribute information, thereby resolving a problem in the prior art. In addition, the user participates in a same video conference using two or more than two terminal devices, each terminal receives video and audio information of a specific conference participant, and the user can randomly switch the terminal to upload local video and audio information, thereby enhancing a function of a WebRTC video conference, improving user experience, saving network bandwidth, and reducing local resource consumption of the terminal.

Embodiment 9

Figure 12:
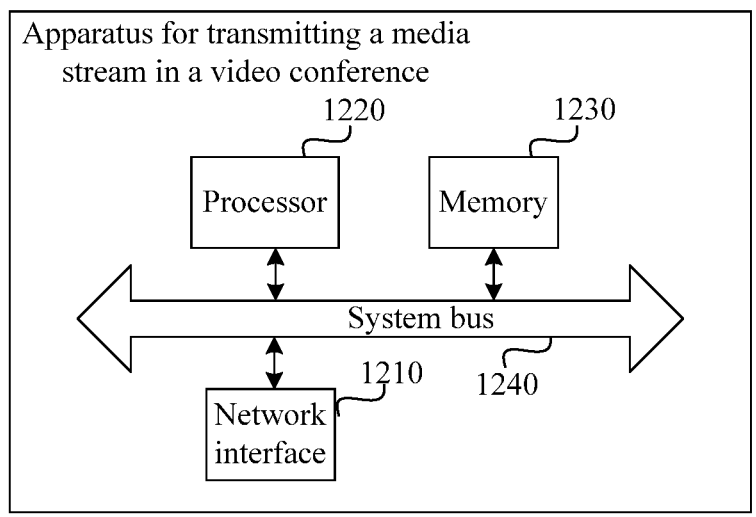
FIG. 12 is a structural diagram of hardware of an apparatus for transmitting a media stream in a video conference according to Embodiment 9 of the present disclosure.

In addition, the apparatus for transmitting a media stream in a video conference according to Embodiment 5 of the present disclosure may also be implemented in the following form, so as to implement the method for transmitting a media stream in a video conference according to Embodiment 1 of the present disclosure. As shown in FIG. 12, the transmission apparatus is located in a terminal and the transmission apparatus includes: a network interface 1210, a processor 1220, and a memory 1230. A system bus 1240 is configured to connect the network interface 1210, the processor 1220, and the memory 1230.

The network interface 1210 is configured to perform interaction communication with a conference server located in a communications network or a user located in a communications network.

The memory 1230 may be a permanent memory, for example, a hard disk drive and a flash memory, and the memory 1230 has a software module and a device driver. The software module can execute the various functional modules of the foregoing method of the present disclosure, and the device driver may be a network and an interface driver.

When being started, the software module is loaded into the memory 1230, and then is accessed by the processor 1220 and executes the following instructions: receiving a first media stream sent by a conference server, where the first media stream includes video and audio information of all conference participants in the video conference; receiving a select instruction, where the select instruction is selecting, from the video and audio information of all the conference participants, a conference participant corresponding to required video and audio information, sending a transmission request message to the conference server according to the select instruction using a WebRTC application, where the transmission request message includes identification information of the conference participant selected by the user, and receiving a second media stream that is sent by the conference server according to the identification information, where the second media stream includes the video and audio information of the selected conference participant.

Further, after accessing the software module of the memory 1230, the processor 1220 executes instructions in the following process: receiving, according to the select instruction, a create instruction sent by the WebRTC application, according to the create instruction, invoking an extended WebRTC interface, and parsing a conference participant attribute of a constraint object in the extended WebRTC interface, extracting the identification information of the selected conference participant from the conference participant attribute, and storing each piece of the identification information of the conference participant in a conference participant list, invoking a content attribute in an extended SDP, loading the conference participant list into a media source identifier mediacnt-src section of the content attribute in the extended SDP, adding the mediacnt-src section to the transmission request message, so that the transmission request message includes the identification information of the selected conference participant, and sending the transmission request message to the conference server by using the WebRTC application.

Further, after accessing the software module of the memory 1230, the processor 1220 executes an instruction in the following process storing the identification information of the selected conference participant in the conference participant attribute.

Further, after accessing the software module of the memory 1230, the processor 1220 executes an instruction in the following process: receiving, by using the WebRTC application, a transmission response message that is sent by the conference server according to the transmission request message, so as to determine that a transmission connection is already established with the conference server.

Further, after accessing the software module of the memory 1230, the processor 1220 executes an instruction in the following process: transmitting the second media stream to the WebRTC application, so that the WebRTC application plays the second media stream.

In conclusion, by applying the apparatus for transmitting a media stream in a video conference according to this embodiment of the present disclosure, a browser of a terminal sends a transmission request message to a conference server according to an instruction of performing selection among video and audio information of all conference participants in the video conference, further receives video and audio information of a selected conference participant, and plays the received video and audio information using a WebRTC application, thereby resolving a problem in the prior art; the browser receives a video and audio of a specific conference participant, so that a video and audio of a conference participant that a user is not interested in can be shielded, thereby enhancing a function of a WebRTC video conference, improving user experience, saving network bandwidth, and reducing local resource consumption of the terminal.

Embodiment 10

Figure 13:
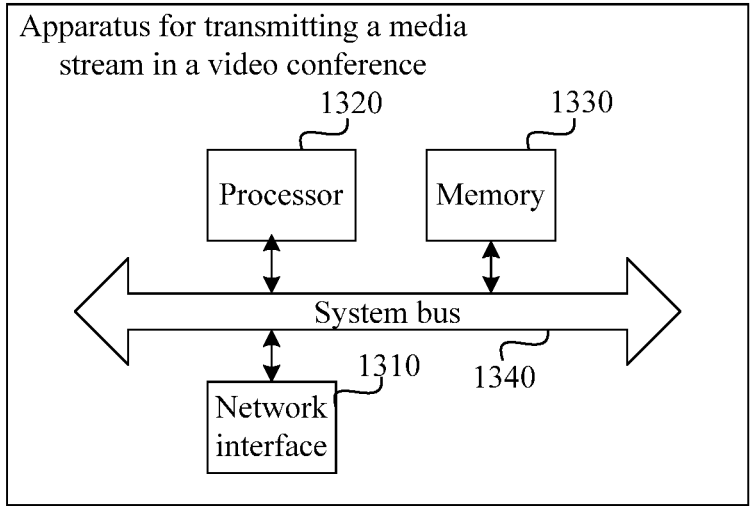
FIG. 13 is a structural diagram of hardware of an apparatus for transmitting a media stream in a video conference according to Embodiment 10 of the present disclosure.

In addition, the apparatus for transmitting a media stream in a video conference according to Embodiment 6 of the present disclosure may also be implemented in the following form, so as to implement the method for transmitting a media stream in a video conference according to Embodiment 2 of the present disclosure. As shown in FIG. 13, the transmission apparatus includes: a network interface 1310, a processor 1320, and a memory 1330. A system bus 1340 is configured to connect the network interface 1310, the processor 1320, and the memory 1330.

The network interface 1310 is configured to perform interaction communication with a browser in a terminal.

The memory 1330 may be a permanent memory, for example, a hard disk drive and a flash memory, and the memory 1330 has a software module and a device driver. The software module can execute the various functional modules of the foregoing method of the present disclosure, and the device driver may be a network and an interface driver.

When being started, the software module is loaded into the memory 1330, and then is accessed by the processor 1320 and executes the following instructions: sending a first media stream to the browser, where the first media stream includes video and audio information of all conference participants in the video conference, receiving a transmission request message that is sent by the browser using a WebRTC application, where the transmission request message includes identification information of a conference participant that is corresponding to required video and audio information and selected from the video and audio information of all the conference participants, extracting, according to the identification information, the video and audio information of the conference participant corresponding to the identification information; and sending a second media stream to the browser, where the second media stream includes the video and audio information of the selected conference participant.

Further, after accessing the software module of the memory 1330, the processor 1320 executes instructions in the following process: invoking an extended WebRTC interface, extracting the identification information of the selected conference participant from the transmission request message according to the invoked extended WebRTC interface, storing the identification information of the selected conference participant in a conference participant list, and sending a transmission response message to the browser by using a connection that is established between the extended WebRTC interface and the WebRTC application, so that the browser can determine that a transmission connection is already established with the conference server.

Further, after accessing the software module of the memory 1330, the processor 1320 executes a specific instruction of a process of the extracting, according to the identification information, the video and audio information of the conference participant corresponding to the identification information: extracting a media tracking object of the corresponding conference participant from the extended WebRTC interface according to the identification information that is of the selected conference participant and stored in the conference participant list, where the media tracking object includes the video and audio information of the conference participant.

Further, after accessing the software module of the memory 1330, the processor 1320 executes a specific instruction of a process of the sending a second media stream to the browser, where the second media stream includes the video and audio information of the selected conference participant: adding the media tracking object to the second media stream, so that the second media stream includes the video and audio information of the selected conference participant.

In conclusion, by applying the apparatus for transmitting a media stream in a video conference according to this embodiment of the present disclosure, a browser of a terminal sends a transmission request message to a conference server according to an instruction of performing selection among video and audio information of all conference participants in the video conference, further receives video and audio information of a selected conference participant, and plays the received video and audio information using a WebRTC application, thereby resolving a problem in the prior art. The browser receives a video and audio of a specific conference participant, so that a video and audio of a conference participant that a user is not interested in can be shielded, thereby enhancing a function of a WebRTC video conference, improving user experience, saving network bandwidth, and reducing local resource consumption of the terminal.

Embodiment 11

Figure 14:
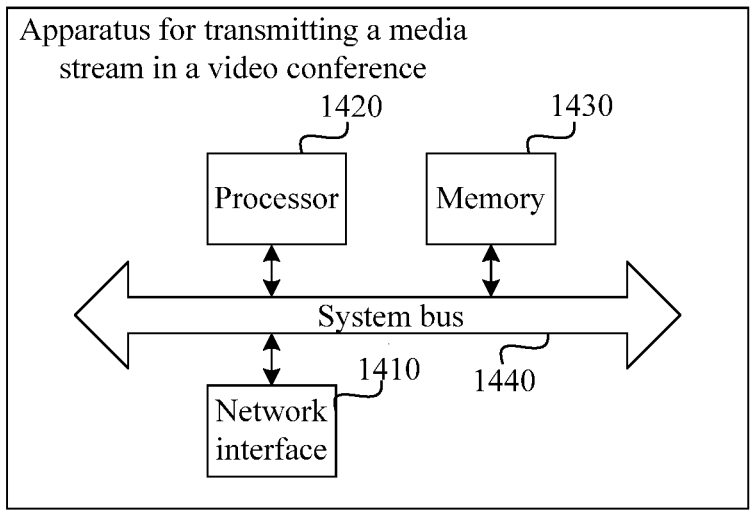
FIG. 14 is a structural diagram of hardware of an apparatus for transmitting a media stream in a video conference according to Embodiment 11 of the present disclosure.

In addition, the apparatus for transmitting a media stream in a video conference according to Embodiment 7 of the present disclosure may also be implemented in the following form, so as to implement the method for transmitting a media stream in a video conference according to Embodiment 3 of the present disclosure. As shown in FIG. 14, each conference site in the video conference includes a first terminal and a second terminal, the transmission apparatus is located in the second terminal, and the transmission apparatus includes: a network interface 1410, a processor 1420, and a memory 1430. A system bus 1440 is configured to connect the network interface 1410, the processor 1420, and the memory 1430.

The network interface 1410 is configured to perform interaction communication with a conference server located in a communications network or a user located in a communications network.

The memory 1430 may be a permanent memory, for example, a hard disk drive and a flash memory, and the memory 1430 has a software module and a device driver. The software module can execute the various functional modules of the foregoing method of the present disclosure, and the device driver may be a network and an interface driver.

When being started, the software module is loaded into the memory 1430, and then is accessed by the processor 1420 and executes the following instructions: receiving a first select instruction when a browser of a first terminal and the transmission apparatus access a conference server using login information of a same user and the browser does not send a first media stream to the conference server, where the first select instruction is selecting to-be-sent video and audio information from the second terminal, sending a first transmission request message to the conference server according to the first select instruction using a first WebRTC application of the second terminal, where the first transmission request message includes port attribute information of the second browser; and when a first transmission response message that is sent by the conference server according to the first transmission request message is received, sending a second media stream to the conference server according to the port attribute information by using a corresponding port, where the second media stream includes the to-be-sent video and audio information.

Further, after accessing the software module of the memory 1430, the processor 1420 executes instructions in the following process: receiving a third media stream sent by the conference server, where the third media stream includes video and audio information of all conference participants in the video conference, receiving a second select instruction, where the second select instruction is selecting, from the video and audio information of all the conference participants, a conference participant corresponding to required video and audio information, sending a second transmission request message to the conference server according to the second select instruction using the first WebRTC application, where the second transmission request message includes identification information of the selected conference participant, receiving, using the first WebRTC application, a second transmission response message sent by the conference server, where the second transmission response message is used for the transmission apparatus to determine not to send video and audio information in the second terminal to the conference server when the browser sends the first media stream to the conference server exists, and receiving a fourth media stream that is sent by the conference server according to the identification information, where the fourth media stream includes the video and audio information of the selected conference participant.

Further, after accessing the software module of the memory 1430, the processor 1420 executes instructions in the following process: receiving, according to the first select instruction, a create instruction sent by the first WebRTC application, according to the create instruction, invoking an extended WebRTC interface, and determining a video sending attribute value and an audio sending attribute value that are of a constraint object in the extended WebRTC interface, when the video sending attribute value is true, setting an attribute of a first video port that has received video information to a port only for receiving a video, and setting an attribute of a second video port that has not received video information to a port only for sending a video, when the audio sending attribute value is true, setting an attribute of an audio port to a transmit and receive port, adding information about the set port attribute to the first transmission request message, so that the first transmission request message includes the port attribute information of the second browser, and sending the first transmission request message to the conference server by using the first WebRTC application of the second terminal.

In conclusion, by applying the method for transmitting a media stream in a video conference according to this embodiment of the present disclosure, multiple terminals that belong to a same user may access a conference server and receive video and audio information of a specific conference participant at the same time; when a first browser does not send a first media stream to the conference server, a second browser generates a first transmission request message according to a received select instruction, where the first transmission request message includes port attribute information of the second browser, and sends a second media stream to the conference server according to the port attribute information, thereby resolving a problem in the prior art. In addition, the user participates in a same video conference by using two or more than two terminal devices, each terminal receives video and audio information of a specific conference participant, and the user can randomly switch the terminal to upload local video and audio information, thereby enhancing a function of a WebRTC video conference, improving user experience, saving network bandwidth, and reducing local resource consumption of the terminal.

Embodiment 12

Figure 15:
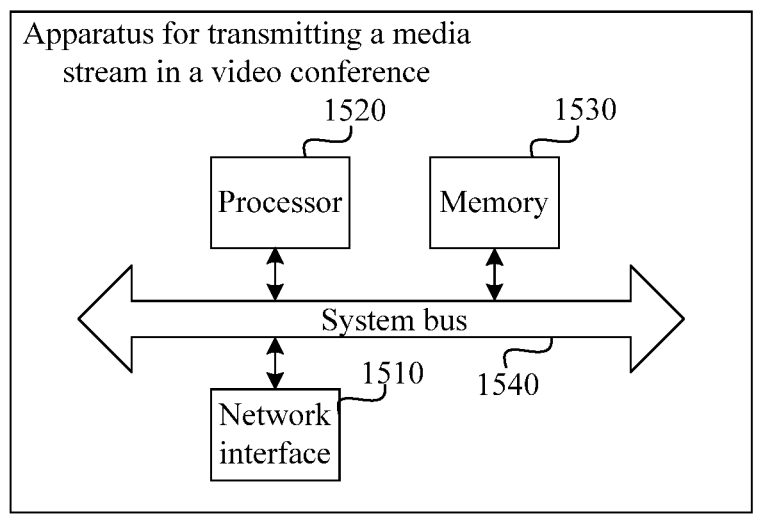
FIG. 15 is a structural diagram of hardware of an apparatus for transmitting a media stream in a video conference according to Embodiment 12 of the present disclosure.

In addition, the apparatus for transmitting a media stream in a video conference according to Embodiment 8 of the present disclosure may also be implemented in the following form, so as to implement the method for transmitting a media stream in a video conference according to Embodiment 4 of the present disclosure. As shown in FIG. 15, the transmission apparatus includes: a network interface 1510, a processor 1520, and a memory 1530. A system bus 1540 is configured to connect the network interface 1510, the processor 1520, and the memory 1530.

The network interface 1510 is configured to perform interaction communication with a browser in a terminal.

The memory 1530 may be a permanent memory, for example, a hard disk drive and a flash memory, and the memory 1530 has a software module and a device driver. The software module can execute the various functional modules of the foregoing method of the present disclosure, and the device driver may be a network and an interface driver.

When being started, the software module is loaded into the memory 1530, and then is accessed by the processor 1520 and executes the following instructions: when a first browser of a first terminal and a second browser of a second terminal access the transmission apparatus using login information of a same user, and the first browser does not send a first media stream to the conference server, receiving a first transmission request message that is sent by the second browser using a first WebRTC application of the second terminal, where the first transmission request message includes port attribute information of the second browser, sending a first transmission response message to the second browser according to the first transmission request message, so that the second browser can determine that a transmission connection is already established with the transmission apparatus, and receiving a second media stream that is sent by the second browser according to the port attribute information, where the second media stream includes to-be-sent video and audio information selected from the second terminal.

Further, after accessing the software module of the memory 1530, the processor 1520 executes instructions in the following process: sending a third media stream to the second browser, where the third media stream includes video and audio information of all conference participants in the video conference, receiving a second transmission request message that is sent by the second browser using the first WebRTC application, where the second transmission request message includes identification information of a conference participant that is corresponding to required video and audio information and selected from the video and audio information of all the conference participants, according to the second transmission request message, invoking an extended WebRTC interface and determining whether the first browser is sending the media stream, if the first browser is sending the media stream, setting a port attribute of the transmission apparatus to a send-only port, adding information about the set port attribute to a second transmission response message, and sending the second transmission response message to the second browser using the first WebRTC application, where the second transmission response message is used for the second browser to determine not to send video and audio information in the second terminal to the transmission apparatus when the first browser sends the media stream to the transmission apparatus exists, extracting, according to the identification information, the video and audio information of the conference participant corresponding to the identification information, and sending a fourth media stream to the second browser, where the fourth media stream includes the video and audio information of the selected conference participant.

Further, after accessing the software module of the memory 1530, the processor 1520 executes an instruction in the following process: sending a fifth media stream to a corresponding port of the second browser according to the port attribute information.

Further, after accessing the software module of the memory 1530, the processor 1520 executes instructions in the following process: invoking an extended WebRTC interface, and determining a video receiving attribute value and an audio receiving attribute value that are of a constraint object in the extended WebRTC interface, when the video receiving attribute value is true, setting an attribute of a video port that has received video information to a port only for sending a video; when the audio receiving attribute value is true, setting an attribute of an audio port that has received audio information to a port only for sending audio, and adding information about the set port attribute to a third transmission request message, and sending the third transmission request message to the first browser, where the third transmission request message is used for the first browser to determine not to send video and audio information in the first terminal to the transmission apparatus.

In conclusion, by applying the apparatus for transmitting a media stream in a video conference according to this embodiment of the present disclosure, multiple terminals that belong to a same user may access a conference server and receive video and audio information of a specific conference participant at the same time, when a first browser does not send a first media stream to the conference server, a second browser generates a first transmission request message according to a received select instruction, where the first transmission request message includes port attribute information of the second browser, and sends a second media stream to the conference server according to the port attribute information, thereby resolving a problem in the prior art. In addition, the user participates in a same video conference using two or more than two terminal devices, each terminal receives video and audio information of a specific conference participant, and the user can randomly switch the terminal to upload local video and audio information, thereby enhancing a function of a WebRTC video conference, improving user experience, saving network bandwidth, and reducing local resource consumption of the terminal.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disk read-only memory (CD-ROM), or any other form of storage medium known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A transmission apparatus for transmitting a media stream in a video conference, wherein the transmission apparatus is located in a terminal, and wherein the transmission apparatus comprises:
a processor; and
a memory device coupled to the processor and configured to store computer executable instructions,
wherein the processor is configured to:
receive a first media stream sent by a conference server, wherein the first media stream comprises a video and audio information of all conference participants in the video conference;
receive a select instruction, wherein the select instruction is selecting, from the video and audio information of all the conference participants, a conference participant corresponding to required video and audio information;
send a transmission request message to the conference server according to the select instruction using a web real-time communication (WebRTC) application, wherein the transmission request message comprises an identification information of the conference participant selected by a user;
receive a second media stream that is sent by the conference server according to the identification information, wherein the second media stream comprises the video and audio information of a selected conference participant;
receive, according to the select instruction, a create instruction sent by the WebRTC application;
invoke an extended WebRTC interface according to the create instruction;
parse a conference participant attribute of a constraint object in the extended WebRTC interface according to the create instruction;
extract the identification information of the selected conference participant from the conference participant attribute;
store each piece of the identification information of the conference participant in a conference participant list;
invoke a content attribute in an extended session description protocol (SDP);
load the conference participant list into a media source identifier mediacnt-src section of the content attribute in the extended SDP;
add the mediacnt-src section to the transmission request message, such that the transmission request message comprises the identification information of the selected conference participant; and
send the transmission request message to the conference server using the WebRTC application.

2. The transmission apparatus according to claim 1, wherein the processor is further configured to store the identification information of the selected conference participant in the conference participant attribute.

3. The transmission apparatus according to claim 1, wherein the processor is further configured to store the identification information of the selected conference participant in the conference participant attribute.

4. The transmission apparatus according to claim 1, wherein the processor is further configured to receive, using the WebRTC application, a transmission response message that is sent by the conference server according to the transmission request message in order to determine that a transmission connection is already established with the conference server.

5. A transmission apparatus for transmitting a media stream in a video conference, wherein the transmission apparatus comprises:

a processor; and
a memory device coupled to the processor and configured to store computer executable instructions,
wherein the processor is configured to:
send a first media stream to a browser, wherein the first media stream comprises a video and audio information of all conference participants in the video conference;
receive a transmission request message that is sent by the browser using a web real-time communication (WebRTC) application, wherein the transmission request message comprises an identification information of a conference participant that is corresponding to required video and audio information and selected from the video and audio information of all the conference participants;
extract, according to the identification information, the video and audio information of the conference participant corresponding to the identification information;
send a second media stream to the browser, wherein the second media stream comprises the video and audio information of a selected conference participant;
invoke an extended WebRTC interface;
extract the identification information of the selected conference participant from the transmission request message according to the invoked extended WebRTC interface;
store the identification information of the selected conference participant in a conference participant list; and
send a transmission response message to the browser using a connection that is established between the extended WebRTC interface and the WebRTC application such that the browser can determine that a transmission connection is already established with a conference server.

6. The transmission apparatus according to claim 5, wherein the processor is further configured to extract a media tracking object of a corresponding conference participant from the extended WebRTC interface according to the identification information that is of the selected conference participant and stored in the conference participant list, and wherein the media tracking object comprises the video and audio information of the conference participant.

7. The transmission apparatus according to claim 5, wherein the processor is further configured to add the media tracking object to the second media stream such that the second media stream comprises the video and audio information of the selected conference participant.

8. A transmission apparatus for transmitting a media stream in a video conference, wherein each conference site in the video conference comprises a first terminal and a second terminal, wherein the transmission apparatus is located in the second terminal, and wherein the transmission apparatus comprises:
a processor; and
a memory device coupled to the processor and configured to store computer executable instructions;
wherein the processor is configured to:
receive a first select instruction when a first browser of the first terminal and the transmission apparatus access a conference server using a login information of a same user and the first browser does not send a first media stream to the conference server, wherein the first select instruction is selecting a to-be-sent video and audio information from the second terminal;
send a first transmission request message to the conference server according to the first select instruction using a first web real-time communication (WebRTC) application of the second terminal, wherein the first transmission request message comprises port attribute information of a second browser;
send a second media stream to the conference server according to the port attribute information using a corresponding port when a first transmission response message that is sent by the conference server according to the first transmission request message is received, wherein the second media stream comprises the to-be-sent video and audio information;
receive a third media stream sent by the conference server, wherein the third media stream comprises a video and audio information of all conference participants in the video conference;
receive a second select instruction, wherein the second select instruction is selecting, from the video and audio information of all the conference participants, a conference participant corresponding to required video and audio information;
send a second transmission request message to the conference server according to the second select instruction using the first WebRTC application, and wherein the second transmission request message comprises identification information of a selected conference participant;
receive, using the first WebRTC application, a second transmission response message sent by the conference server, wherein the second transmission response message is used for the transmission apparatus to determine not to send video and audio information in the second terminal to the conference server when the first browser sends the first media stream to the conference server exists; and
receive a fourth media stream that is sent by the conference server according to the identification information, wherein the fourth media stream comprises the video and audio information of the selected conference participant.

9. The transmission apparatus according to claim 8, wherein the processor is further configured to:
receive, according to the first select instruction, a create instruction sent by the first WebRTC application;
invoke an extended WebRTC interface, according to the create instruction;
determine a video sending attribute value and an audio sending attribute value that are of a constraint object in the extended WebRTC interface, according to the create instruction;
set an attribute of a first video port that has received video information to a port only for receiving a video when the video sending attribute value is true;
set an attribute of a second video port that has not received video information to a port only for sending the video when the video sending attribute value is true;
set an attribute of an audio port to a transmit and receive port when the audio sending attribute value is true;
add information about the set port attribute to the first transmission request message, such that the first transmission request message comprises the port attribute information of the second browser; and send the first transmission request message to the conference server using the first WebRTC application of the second terminal.

\* \* \* \* \*